United States Patent
Hsieh et al.

(10) Patent No.: US 9,791,666 B2
(45) Date of Patent: Oct. 17, 2017

(54) IMAGING OPTICAL SYSTEM, IMAGE CAPTURING APPARATUS AND ELECTRONIC DEVICE

(71) Applicant: LARGAN PRECISION CO., LTD., Taichung (TW)

(72) Inventors: Dung-Yi Hsieh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/967,957

(22) Filed: Dec. 14, 2015

(65) Prior Publication Data
US 2017/0090154 A1 Mar. 30, 2017

(30) Foreign Application Priority Data
Sep. 25, 2015 (TW) .............................. 104131748 A

(51) Int. Cl.
| | |
|---|---|
| *G02B 13/18* | (2006.01) |
| *G02B 13/00* | (2006.01) |
| *G02B 9/34* | (2006.01) |
| *G02B 13/02* | (2006.01) |
| *G02B 13/14* | (2006.01) |

(52) U.S. Cl.
CPC ............. *G02B 13/004* (2013.01); *G02B 9/34* (2013.01); *G02B 13/02* (2013.01); *G02B 13/14* (2013.01)

(58) Field of Classification Search
CPC ...... G02B 13/04; G02B 13/18; G02B 15/177; G02B 9/64; G02B 13/005; G02B 13/006; G02B 27/0025

USPC ....... 359/357, 682, 753, 750, 749, 784, 754, 359/689, 649, 651; 358/713, 714, 715
See application file for complete search history.

(56) References Cited

U.S. PATENT DOCUMENTS

| | | | |
|---|---|---|---|
| 2,559,881 A | 7/1951 | Kingslake et al. | |
| 5,394,272 A | 2/1995 | Kvamme et al. | |
| 8,068,290 B1 * | 11/2011 | Tsai ..................... | G02B 13/004 359/715 |
| 8,503,108 B2 | 8/2013 | Huang | |

(Continued)

FOREIGN PATENT DOCUMENTS

| | | |
|---|---|---|
| JP | 1995-104181 A | 4/1995 |
| JP | 1995-294810 A | 11/1995 |
| JP | 2005-025023 A | 1/2005 |

*Primary Examiner* — Stephone B Allen
*Assistant Examiner* — Rahman Abdur
(74) *Attorney, Agent, or Firm* — Locke Lord LLP; Tim Tingkang Xia, Esq.

(57) ABSTRACT

An imaging optical system includes, in order from an object side to an image side: a first lens element with positive refractive power having an object-side surface being convex in a paraxial region thereof; a second lens element having negative refractive power; a third lens element having an object-side surface being concave in a paraxial region thereof, both of the object-side surface and an image-side surface thereof being aspheric; and a fourth lens element with negative refractive power having an object-side surface being concave in a paraxial region thereof and an image-side surface being convex in a paraxial region thereof, both of the object-side and image-side surfaces thereof being aspheric. There are a total of four lens elements in the imaging optical system, and an air gap is arranged between every two adjacent lens elements.

43 Claims, 19 Drawing Sheets

(56) References Cited

U.S. PATENT DOCUMENTS

| | | | | |
|---|---|---|---|---|
| 8,879,173 B2* | 11/2014 | Kubota | ................ | G02B 13/004 359/715 |
| 2009/0268312 A1* | 10/2009 | Onoda | ..................... | G02B 9/34 359/773 |
| 2012/0113310 A1* | 5/2012 | Huang | ..................... | G02B 9/34 348/340 |
| 2015/0168680 A1 | 6/2015 | Shih | | |

\* cited by examiner

IMAGING OPTICAL SYSTEM, IMAGE CAPTURING APPARATUS AND ELECTRONIC DEVICE

RELATED APPLICATIONS

This application claims priority to Taiwan Application Serial Number 104131748, filed on Sep. 25, 2015, which is incorporated by reference herein in its entirety.

BACKGROUND

Technical Field

The present disclosure relates to an imaging optical system and an image capturing apparatus, and more particularly, to an imaging optical system and an image capturing apparatus applicable to electronic devices.

Description of Related Art

As personal electronic products nowadays are becoming more and more compact, the internal components of the electronic products are also required to be smaller than before, resulting in an increasing demand for compact imaging optical systems. In addition to the demand of miniaturization, the reduction of the pixel size of image sensors in the advanced semiconductor manufacturing technologies has enabled imaging lenses to evolve toward the field of higher megapixels. Meanwhile, the popularity of smartphones and tablet personal computers boosts the need for compact imaging optical systems featuring high image quality.

A conventional imaging optical system comprising four lens elements typically comprises a fourth lens element having a concave image-side surface. Although such a configuration is favorable for reducing the back focal length of the imaging optical system, it is not favorable for suppressing the incident angle of the light projecting onto an image sensor. In addition, for a telephoto optical system that has a smaller field of view, the conventional configuration as described above may have its drawback, as it would be hard to obtain a balance between a favorable manufacturing process and an appropriate sensitivity of the system.

Although the configuration of a conventional imaging optical system comprising four lens elements is advantageous in keeping a compact size, image quality of such a system still needs improvements. Therefore, a need exists in the art for an imaging optical system that features a compact design and high image quality.

SUMMARY

According to one aspect of the present disclosure, an imaging optical system includes, in order from an object side to an image side: a first lens element with positive refractive power having an object-side surface being convex in a paraxial region thereof; a second lens element having negative refractive power; a third lens element having an object-side surface being concave in a paraxial region thereof, both of the object-side surface and an image-side surface thereof being aspheric; and a fourth lens element with negative refractive power having an object-side surface being concave in a paraxial region thereof and an image-side surface being convex in a paraxial region thereof, both of the object-side and image-side surfaces thereof being aspheric; wherein the imaging optical system has a total of four lens elements, and an air gap is arranged between every two adjacent lens elements; wherein a focal length of the second lens element is f2, a focal length of the fourth lens element is f4, a focal length of the imaging optical system is f, a maximum image height of the imaging optical system is ImgH, an axial distance between the second lens element and the third lens element is T23, an axial distance between the third lens element and the fourth lens element is T34, and the following conditions are satisfied:

$$1.0 < f2/f4;$$

$$2.0 < f/\text{ImgH}; \text{ and}$$

$$1.0 < T23/T34.$$

According to another aspect of the present disclosure, an image capturing apparatus is provided, which includes the aforementioned imaging optical system and an image sensor disposed on or near an image surface of the imaging optical system.

According to yet another aspect of the present disclosure, an electronic device is provided, which includes the aforementioned image capturing apparatus.

DETAILED DESCRIPTION

Figure 1A:
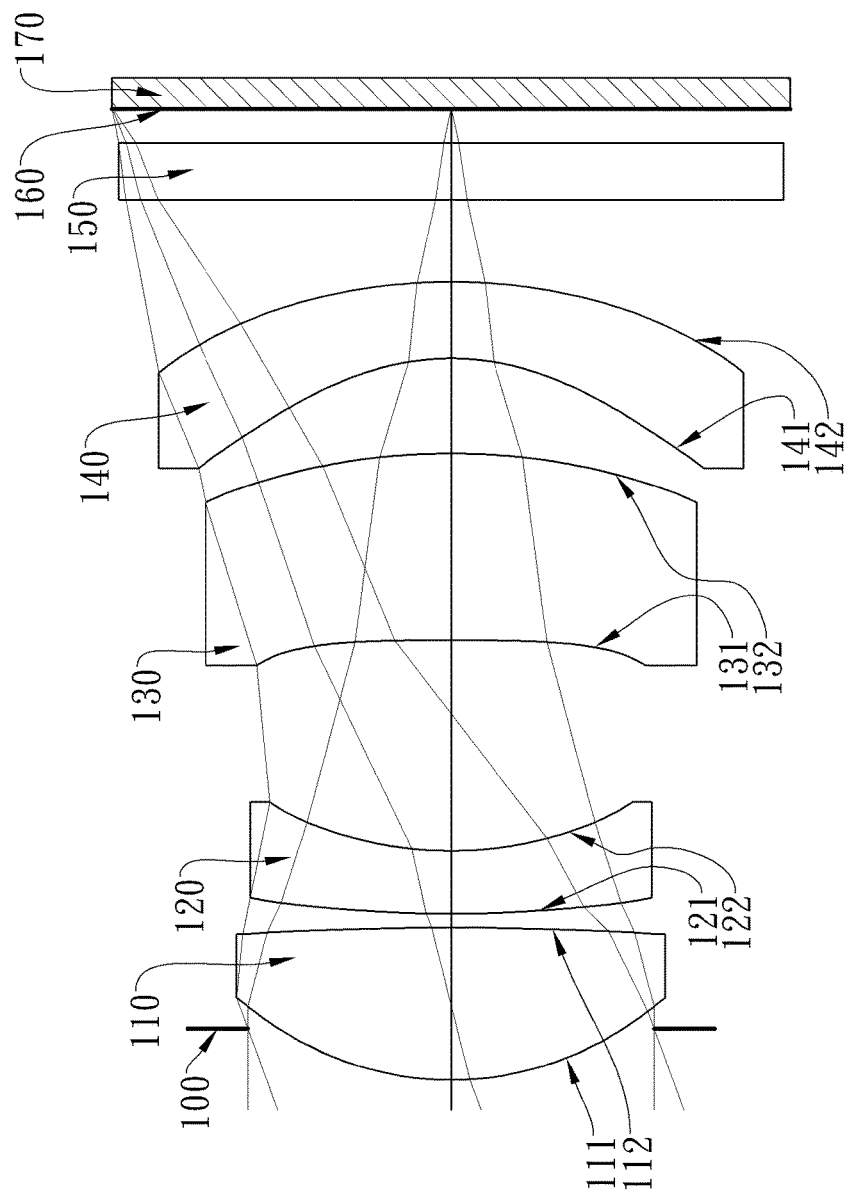
FIG. 1A is a schematic view of an image capturing apparatus according to the 1st embodiment of the present disclosure.

The present disclosure provides an imaging optical system including, in order from an object side to an image side, a first lens element, a second lens element, a third lens element, and a fourth lens element, wherein the imaging optical system has a total of four lens elements.

Under the configuration for an imaging optical system according to the present disclosure, a desirable balance between a favorable manufacturing process and an appropriate sensitivity of the system can be obtained, and a more satisfactory telephoto capability can also be obtained. Moreover, by properly adjusting the focal lengths of the second and the fourth lens elements, the direction change of incident light after it enters the system can be moderated; consequently, the stray light intensity can be favorably reduced and the image quality can be improved.

The first lens element has positive refractive power so that the convergent capability is mainly contributed from the object side of the imaging optical system; consequently, the size of the imaging optical system can be effectively controlled and portability can be increased. The object-side surface of the first lens element is convex in a paraxial region thereof so as to adjust the distribution of the positive refractive power, thereby enhancing the miniaturization of the imaging optical system.

The second lens element has negative refractive power so as to correct the chromatic aberration of the imaging optical system. The second lens element may be a meniscus lens having a convex object-side surface and a concave image-side surface, which is favorable for correcting astigmatism generated by the first lens element, and can effectively control the refractive power of the second lens element, so that the aberration generated by the system can be corrected. The object-side surface of the second lens element may be concave in a paraxial region thereof so as to favorably correct aberrations.

The object-side surface of the third lens element is concave in a paraxial region thereof, which is favorable for correcting the astigmatism of the system.

The fourth lens element has negative refractive power so as to effectively correct the Petzval's sum of the system, thereby correcting the image field curvature.

The object-side surface of the fourth lens element may be concave in a paraxial region thereof, and the image-side surface of the fourth lens element may be convex in a paraxial region thereof; such an arrangement is favorable for correcting the astigmatism so as to improve image quality. When the fourth lens element is a meniscus lens having a concave object-side surface and a convex image-side surface, it is favorable for achieving a balance between a favorable manufacturing process and an appropriate sensitivity of the system. The fourth lens element may have at least one inflection point on the object-side surface in an off-axial region thereof so that the incident angle of the light projecting onto an image sensor from the off-axial field can be suppressed and the receiving efficiency of the image sensor can be increased.

When the imaging optical system is further provided with a stop disposed between an imaged object and the second lens element, it is favorable for enlarging the field of view of the system, thereby providing the imaging optical system the advantages of a wide-angle lens.

When a focal length of the second lens element is f2, a focal length of the fourth lens element is f4, and the following condition is satisfied: $1.0<f2/f4$, the light travel within the imaging optical system can be well moderated, and consequently the stray light can be favorably reduced.

When a focal length of the imaging optical system is f, a maximum image height of the imaging optical system is ImgH (i.e. half of a diagonal length of an effective photosensitive area of the image sensor), and the following condition is satisfied: $2.0<f/ImgH$, the system can have a more satisfactory telephoto capability. Preferably, the following condition is satisfied: $2.40<f/ImgH<5.0$.

When an axial distance between the second lens element and the third lens element is T23, an axial distance between the third lens element and the fourth lens element is T34, and the following condition is satisfied: $1.0<T23/T34$, it is favorable for the system to provide the telephoto functionality. Preferably, the following condition is satisfied: $2.0<T23/T34$. More preferably, the following condition is satisfied: $3.0<T23/T34$.

When a focal length of the second lens element is f2, a focal length of the third lens element is f3, and the following condition is satisfied: $|f2/f3|<1.25$, it is favorable for balancing the refractive power of the imaging optical system, and also favorable for correcting the aberration and reducing the sensitivity of the system. Preferably, the following condition is satisfied: $|f2/f3|<1.0$.

When a central thickness of the first lens element is CT1, a central thickness of the second lens element is CT2, a central thickness of the third lens element is CT3, a central thickness of the fourth lens element is CT4, and the following condition is satisfied: $0.50<CT1/(CT2+CT3+CT4)<1.50$, the spatial arrangement of the system can be effectively controlled to achieve a balance between the simpler assembly of the imaging optical system and the configuration of shapes of lens surfaces.

When a vertical distance from a maximum effective diameter position on the object-side surface of the first lens element to an optical axis is SD11, a vertical distance from a maximum effective diameter position on the image-side surface of the fourth lens element to the optical axis is SD42, and the following condition is satisfied: $0.65<SD11/SD42<1.20$, it is favorable for controlling the entry and exit of incident light of the imaging optical system, and the system can provide better telephoto image quality.

When a sum of the central thicknesses of the first lens element, the second lens element, the third lens element, and the fourth lens element is $\Sigma CT$, an axial distance between the second lens element and the third lens element is T23, and the following condition is satisfied: $\Sigma CT/T23<1.50$, it is favorable for the miniaturization of the imaging optical system. Preferably, the following condition is satisfied: $1.0<\Sigma CT/T23<10$.

When an entrance pupil diameter of the imaging optical system is EPD, a maximum image height of the imaging optical system is ImgH, and the following condition is satisfied: $0.80<EPD/ImgH<2.0$, sufficient brightness of the image can be ensured, which is favorable for providing the sharpness and clarity of the image in low light conditions.

When an Abbe number of the second lens element is V2, an Abbe number of the third lens element is V3, and the following condition is satisfied: V2+V3<60, it is favorable for preventing the chromatic aberration from being excessively corrected due to high refractive power at the front end of the imaging optical system, so that the chromatic aberration can be properly controlled.

When a curvature radius of the image-side surface of the third lens element is R6, a curvature radius of the object-side surface of the fourth lens element is R7, and the following condition is satisfied: |R6+R7|/(R6−R7)|<30, the curvatures of the third and fourth lens elements can be better balanced, thereby providing higher image quality.

When a focal length of the first lens element is f1, a focal length of the fourth lens element is f4, and the following condition is satisfied: 0.60<f1/|f4|<1.20, it is favorable for evenly distributing the refractive power of the lens elements so that a configuration for a narrower field of view can be achieved.

When an axial distance between the image-side surface of the fourth lens element and an image surface is BL, an axial distance between the object-side surface of the first lens element and the image surface is TL, and the following condition is satisfied: 0<BL/TL<0.25, the back focal length of the system can be effectively controlled, which is favorable for keeping the system compact.

When the imaging optical system is applicable in a light wavelength range of 750 to 1050 nm, it is favorable for utilizing the imaging optical system for infrared imaging applications.

When an axial distance between the object-side surface of the first lens element and the image surface is TL, and the following condition is satisfied: TL<6.0 mm, it is favorable for keeping the system compact.

According to the imaging optical system of the present disclosure, the lens elements thereof can be made of glass or plastic material. When the lens elements are made of glass material, the distribution of the refractive power of the imaging optical system may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required number of lens elements, the total track length of the imaging optical system can be effectively reduced.

According to the imaging optical system of the present disclosure, the imaging optical system can include at least one stop, such as an aperture stop, a glare stop or a field stop, so as to favorably reduce the amount of stray light and thereby to improve the image quality.

According to the imaging optical system of the present disclosure, a stop can be configured as a front stop or a middle stop. A front stop disposed between an imaged object and the first lens element can provide a longer distance between an exit pupil of the imaging optical system and the image surface, so that the generated telecentric effect can improve the image-sensing efficiency of an image sensor, such as a CCD or CMOS sensor. A middle stop disposed between the first lens element and the image surface is favorable for enlarging the field of view of the imaging optical system, thereby providing the advantages of a wide-angle lens for the same.

According to the imaging optical system of the present disclosure, when the lens element has a convex surface and the region of convex shape is not defined, it indicates that the surface can be convex in the paraxial region thereof; when the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging optical system of the present disclosure, an image surface of the imaging optical system, based on the corresponding image sensor, can be a planar or curved surface with any curvature, especially a curved surface being concave facing towards the object side.

The imaging optical system of the present disclosure can be optionally applied to moving focus optical systems. According to the imaging optical system of the present disclosure, the imaging optical system features good correction capability and high image quality, and can be applied to 3D (three-dimensional) image capturing applications and electronic devices, such as digital cameras, mobile devices, digital tablets, smart TV, network surveillance devices, motion sensing input devices, driving recording systems, rear view camera systems, and wearable devices.

According to the present disclosure, an image capturing apparatus is provided, which includes the aforementioned imaging optical system and an image sensor, wherein the image sensor is disposed on or near an image surface of the imaging optical system. Therefore, the design of the imaging optical system enables the image capturing apparatus to achieve the best image quality. Preferably, the imaging optical system can further include a barrel member, a holder member or a combination thereof.

Figure 9A:
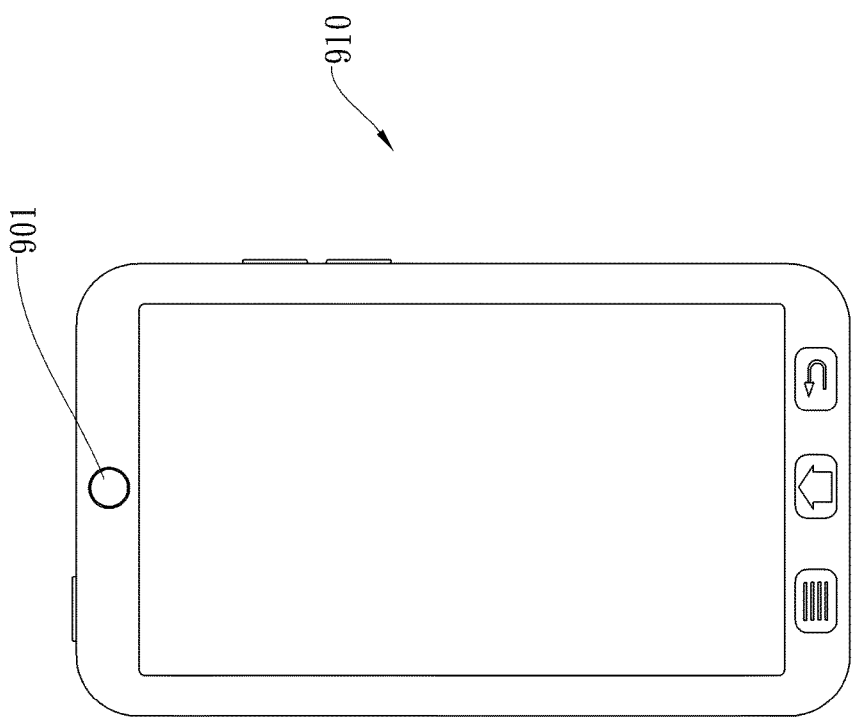
FIG. 9A shows a smartphone with an image capturing apparatus of the present disclosure installed therein.
Figure 9B:
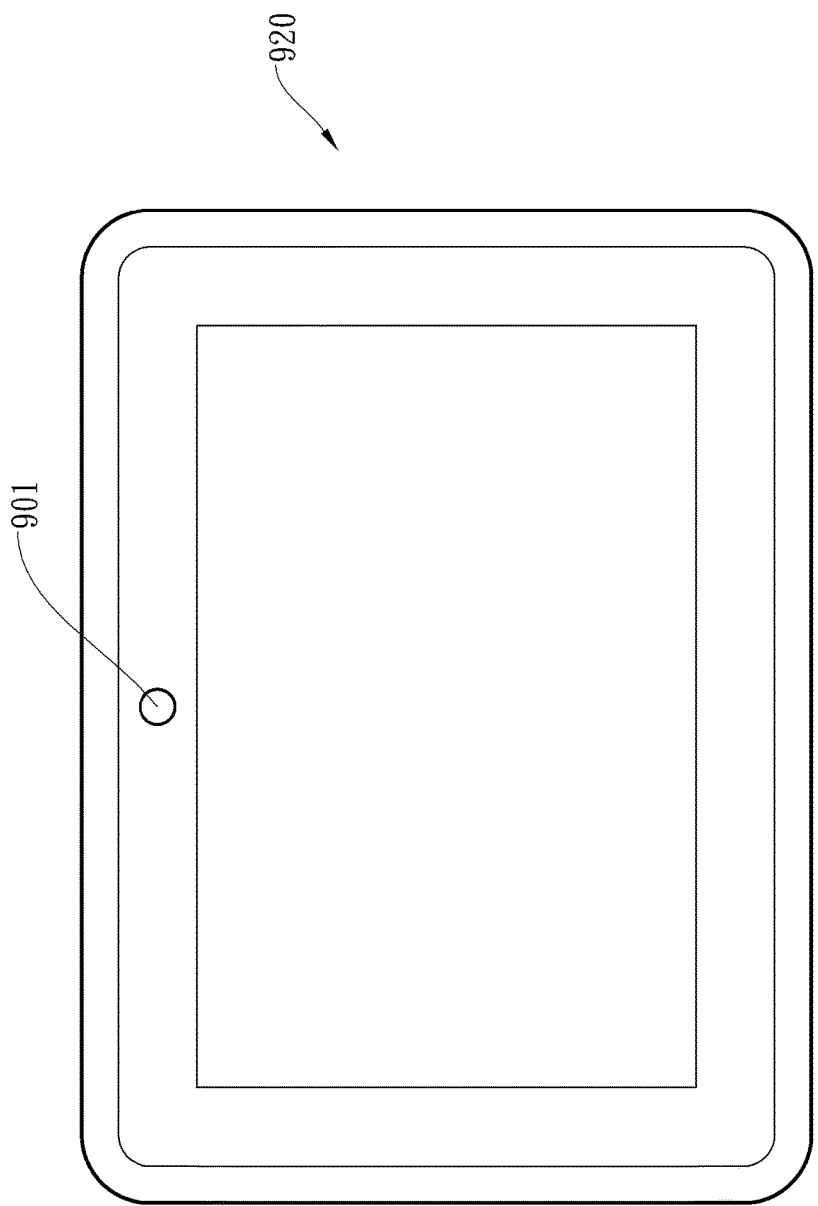
FIG. 9B shows a tablet personal computer with an image capturing apparatus of the present disclosure installed therein.
Figure 9C:
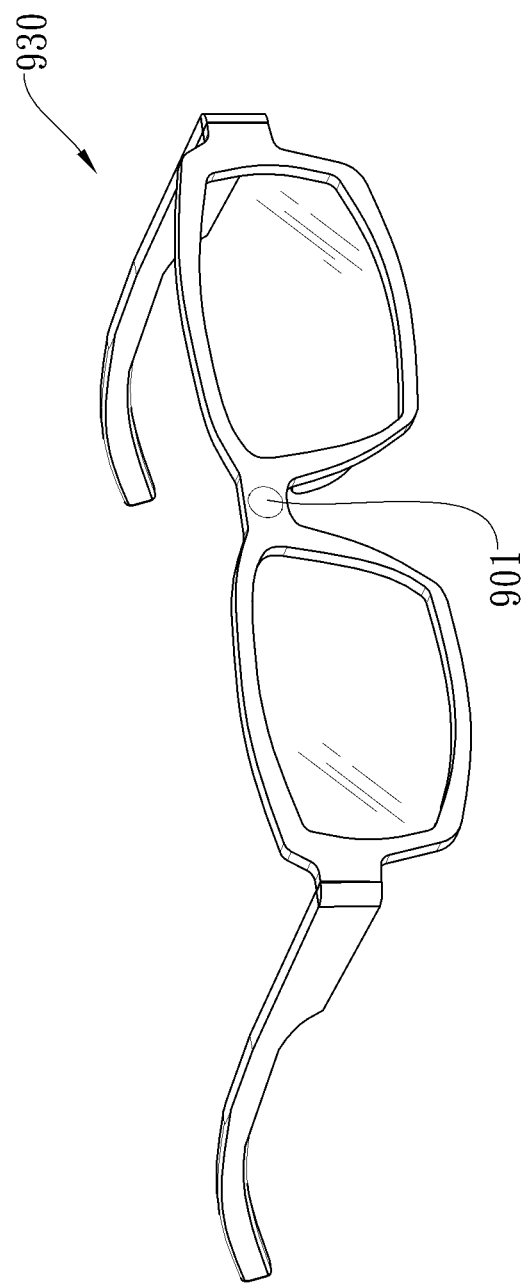
FIG. 9C shows a wearable device with an image capturing apparatus of the present disclosure installed therein.

Referring to FIG. 9A, FIG. 9B and FIG. 9C, an image capturing apparatus 901 may be installed in an electronic device including, but not limited to, a smartphone 910, a tablet personal computer 920 or a wearable device 930. The three exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-8th specific embodiments are provided for further explanation.

1st Embodiment

Figure 1B:
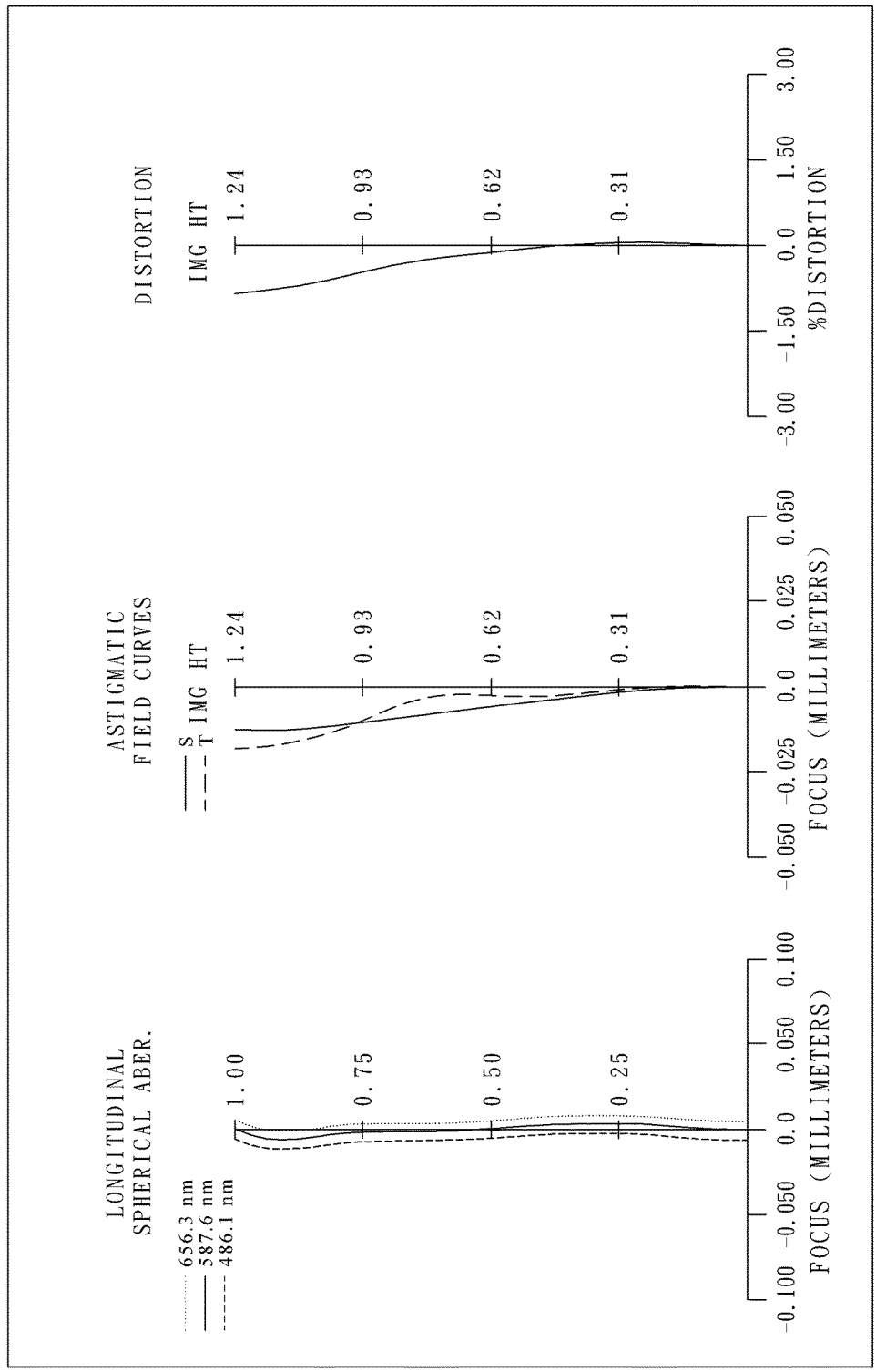
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes an imaging optical system (not otherwise herein labeled) of the present disclosure and an image sensor 170. The imaging optical system includes, in order from an object side to an image side: an aperture stop 100, a first lens element 110, a second lens element 120, a third lens element 130, and a fourth lens element 140. The imaging optical system has a total of four lens elements (110-140).

The first lens element 110 with positive refractive power has an object-side surface 111 being convex in a paraxial region thereof and an image-side surface 112 being convex in a paraxial region thereof, which are both aspheric, and the first lens element 110 is made of plastic material.

The second lens element 120 with negative refractive power has an object-side surface 121 being convex in a paraxial region thereof and an image-side surface 122 being concave in a paraxial region thereof, which are both aspheric, and the second lens element 120 is made of plastic material.

The third lens element 130 with positive refractive power has an object-side surface 131 being concave in a paraxial region thereof and an image-side surface 132 being convex in a paraxial region thereof, which are both aspheric, and the third lens element 130 is made of plastic material.

The fourth lens element 140 with negative refractive power has an object-side surface 141 being concave in a paraxial region thereof and an image-side surface 142 being convex in a paraxial region thereof, which are both aspheric, and the fourth lens element 140 is made of plastic material.

The imaging optical system further includes a filter 150 located between the fourth lens element 140 and an image surface 160. The filter 150 is made of glass and will not affect the focal length of the imaging optical system. The image sensor 170 is disposed on or near the image surface 160 of the imaging optical system.

The equation of the aspheric surface profiles is expressed as follows:

$$X(Y) = (Y^2/R)/(1 + \text{sqrt}(1-(1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the first embodiment, a focal length of the imaging optical system is f, an f-number of the imaging optical system is Fno, half of a maximal field of view of the imaging optical system is HFOV, and these parameters have the following values: f=3.45 mm; Fno=2.32; and HFOV=20.0 degrees.

In the first embodiment, an Abbe number of the second lens element 120 is V2, an Abbe number of the third lens element 130 is V3, and they satisfy the condition: V2+V3=47.0.

In the first embodiment, a central thickness of the first lens element 110 is CT1, a central thickness of the second lens element 120 is CT2, a central thickness of the third lens element 130 is CT3, a central thickness of the fourth lens element 140 is CT4, and they satisfy the condition: CT1/(CT2+CT3+CT4)=0.47.

In the first embodiment, a sum of the central thicknesses of the first lens element 110, the second lens element 120, the third lens element 130, and the fourth lens element 140 is ΣCT, an axial distance between the second lens element 120 and the third lens element 130 is T23, and they satisfy the condition: ΣCT/T23=2.27.

In the first embodiment, the axial distance between the second lens element 120 and the third lens element 130 is T23, an axial distance between the third lens element 130 and the fourth lens element 140 is T34, and they satisfy the condition: T23/T34=2.22.

In the first embodiment, an axial distance between the image-side surface 142 of the fourth lens element 140 and an image surface 160 is BL, an axial distance between the object-side surface 111 of the first lens element 110 and the image surface 160 is TL, and they satisfy the condition: BL/TL=0.18.

In the first embodiment, the axial distance between the object-side surface 111 of the first lens element 110 and the image surface 160 is TL, and it has the following value: TL=3.56 mm.

In the first embodiment, a curvature radius of the image-side surface 132 of the third lens element 130 is R6, a curvature radius of the object-side surface 141 of the fourth lens element 140 is R7, and they satisfy the condition: |R6+R7|/(R6−R7)|=2.24.

In the first embodiment, a focal length of the first lens element 110 is f1, a focal length of the fourth lens element 140 is f4, and they satisfy the condition: f1/|f4|=0.64.

In the first embodiment, a focal length of the second lens element 120 is f2, the focal length of the fourth lens element 140 is f4, and they satisfy the condition: f2/f4=1.08.

In the first embodiment, the focal length of the second lens element 120 is f2, a focal length of the third lens element 130 is f3, and they satisfy the condition: |f2/f3|=0.66.

In the first embodiment, an entrance pupil diameter of the imaging optical system is EPD, a maximum image height of the imaging optical system is ImgH, and they satisfy the condition: EPD/ImgH=1.20.

In the first embodiment, the focal length of the imaging optical system is f, the maximum image height of the imaging optical system is ImgH, and they satisfy the condition: f/ImgH=2.78.

In the first embodiment, a vertical distance from a maximum effective diameter position on the object-side surface 111 of the first lens element 110 to the optical axis is SD11, a vertical distance from a maximum effective diameter position on the image-side surface 142 of the fourth lens element 140 to the optical axis is SD42, and they satisfy the condition: SD11/SD42=0.73.

The detailed optical data of the first embodiment are shown in TABLE 1, and the aspheric surface data are shown in TABLE 2, wherein the units of the curvature radius, the thickness and the focal length are expressed in mm, and HFOV is half of the maximal field of view.

TABLE 1

(1st Embodiment)
f = 3.45 mm, Fno = 2.32, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.190 | | | | |
| 2 | Lens 1 | 1.123 | ASP | 0.560 | Plastic | 1.544 | 55.9 | 1.88 |

TABLE 1-continued (1st Embodiment)
f = 3.45 mm, Fno = 2.32, HFOV = 20.0 deg.

| Surface # | | Curvature Radius | | Thickness | Material | Index | Abbe # | Focal Length |
|---|---|---|---|---|---|---|---|---|
| 3 | | −9.220 | ASP | 0.050 | | | | |
| 4 | Lens 2 | 4.086 | ASP | 0.230 | Plastic | 1.639 | 23.5 | −3.17 |
| 5 | | 1.325 | ASP | 0.774 | | | | |
| 6 | Lens 3 | −11.884 | ASP | 0.685 | Plastic | 1.639 | 23.5 | 4.83 |
| 7 | | −2.504 | ASP | 0.348 | | | | |
| 8 | Lens 4 | −0.959 | ASP | 0.280 | Plastic | 1.639 | 23.5 | −2.93 |
| 9 | | −2.192 | ASP | 0.300 | | | | |
| 10 | Filter | Plano | | 0.210 | Glass | 1.517 | 64.2 | — |
| 11 | | Plano | | 0.124 | | | | |
| 12 | Image Surface | Plano | | — | | | | |

Note:
Reference wavelength is d-line 587.6 nm

TABLE 2

Aspheric Coefficients

| | Surface # | | | |
|---|---|---|---|---|
| | 2 | 3 | 4 | 5 |
| k = | −2.1730E+00 | −1.0621E+01 | −5.0000E+01 | −9.3024E−01 |
| A4 = | 1.7222E−01 | 1.1024E−02 | −5.7152E−02 | −8.6641E−02 |
| A6 = | 2.2662E−02 | 1.7815E−01 | 2.8392E−01 | 1.5015E−01 |
| A8 = | −1.7098E−01 | −6.4369E−01 | −4.5891E−01 | 1.7902E+00 |
| A10 = | 3.3351E−01 | 1.1001E+00 | 3.9000E−01 | −8.5615E+00 |
| A12 = | −2.4064E−01 | −1.0941E+00 | 2.0339E−01 | 1.8464E+01 |
| A14 = | −5.8272E−02 | 4.2789E−01 | −3.1568E−01 | −1.3938E+01 |

| | Surface # | | | |
|---|---|---|---|---|
| | 6 | 7 | 8 | 9 |
| k = | −5.0000E+01 | −3.9458E+00 | −1.9861E−01 | 1.3957E+00 |
| A4 = | −1.4742E−01 | −1.3117E−01 | −1.3293E−01 | −1.2430E−01 |
| A6 = | −1.2787E−01 | 6.9403E−01 | 2.2819E+00 | 6.5623E−01 |
| A8 = | −9.6081E−02 | −2.7347E+00 | −7.7355E+00 | −1.6393E+00 |
| A10 = | 9.3203E−02 | 5.5401E+00 | 1.3794E+01 | 2.0160E+00 |
| A12 = | −9.1539E−01 | −5.4094E+00 | −1.1804E+01 | −1.1888E+00 |
| A14 = | −6.1263E−02 | 1.9981E+00 | 3.9025E+00 | 2.6765E−01 |

2nd Embodiment

Figure 2A:
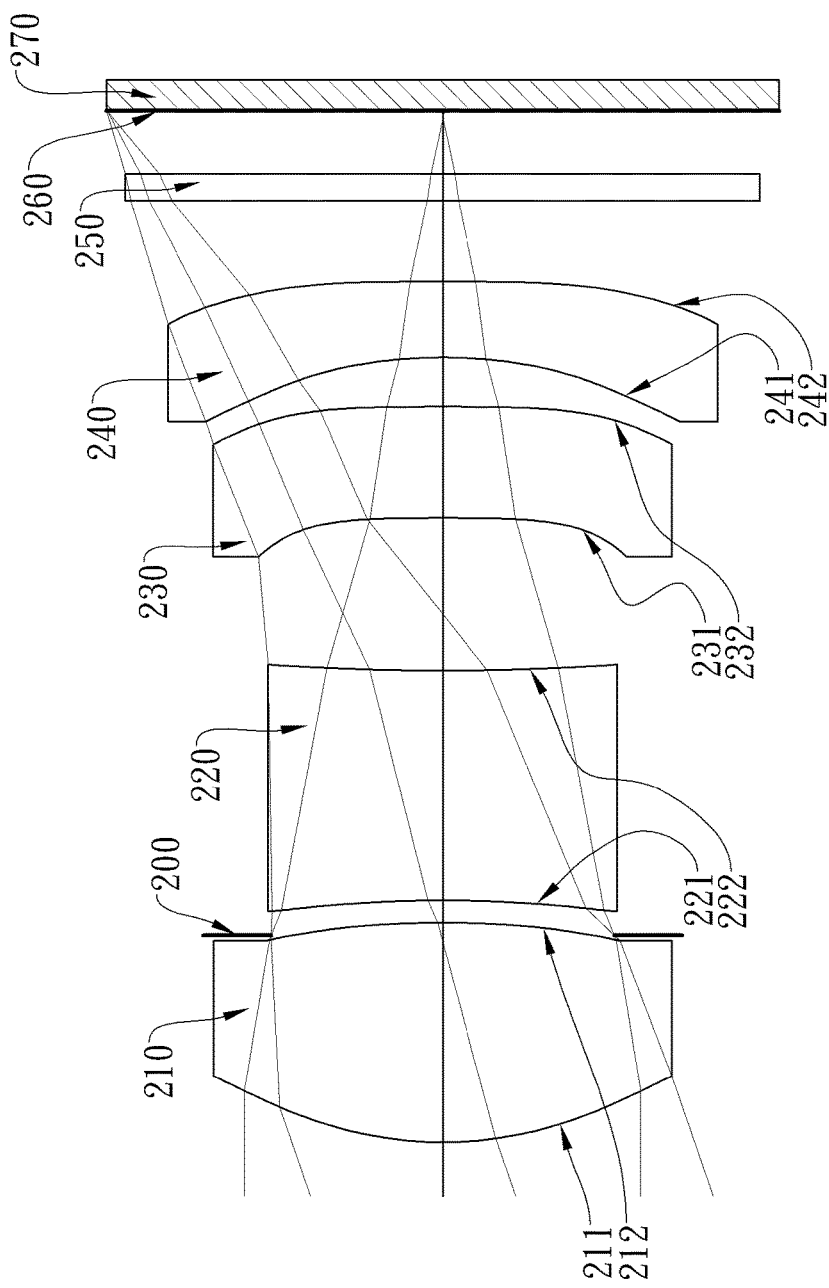
FIG. 2A is a schematic view of an image capturing apparatus according to the 2nd embodiment of the present disclosure.
Figure 2B:
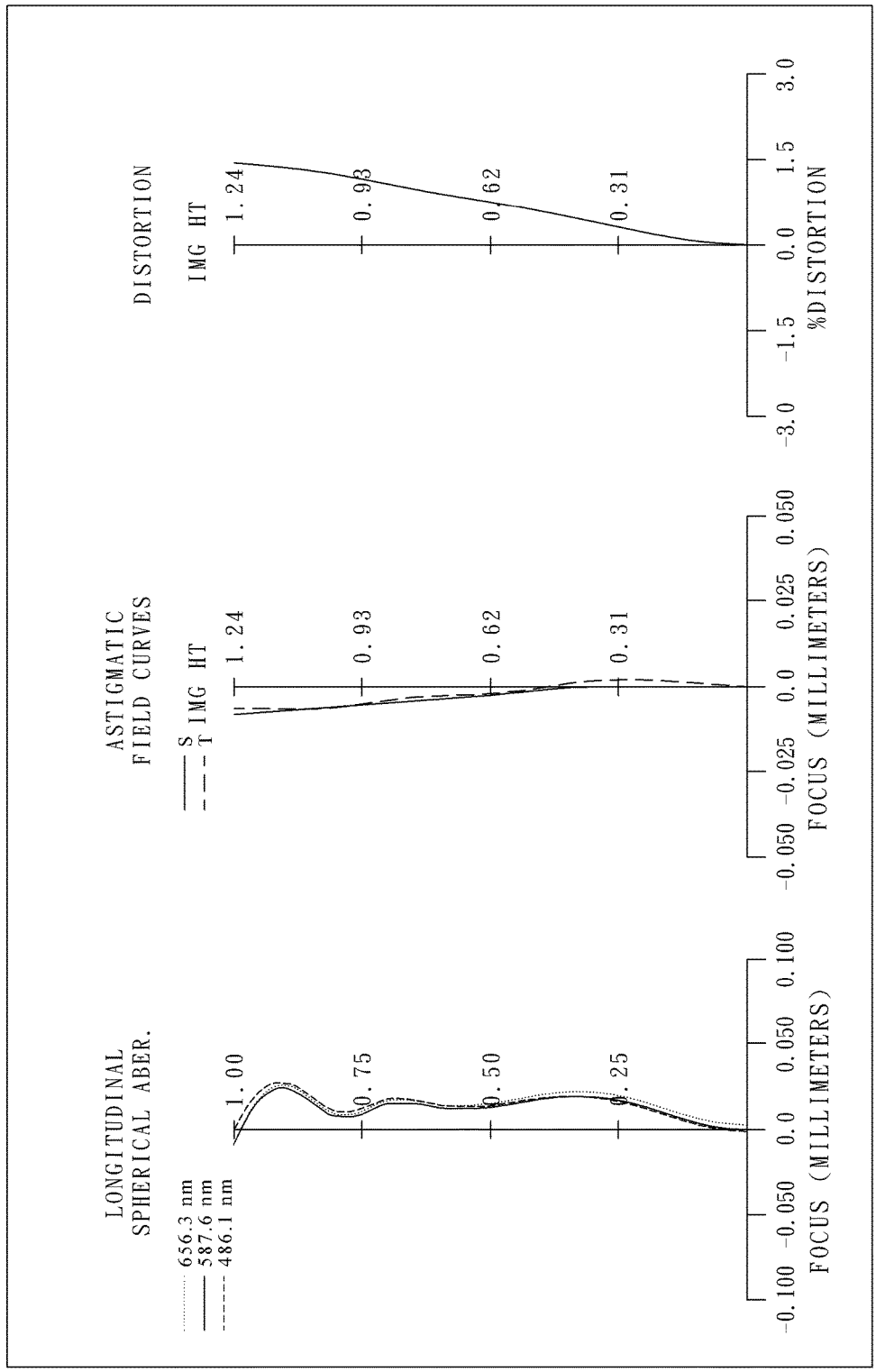
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes an imaging optical system (not otherwise herein labeled) of the present disclosure and an image sensor 270. The imaging optical system includes, in order from an object side to an image side: a first lens element 210, an aperture stop 200, a second lens element 220, a third lens element 230, and a fourth lens element 240. The imaging optical system has a total of four lens elements (210-240).

The first lens element 210 with positive refractive power has an object-side surface 211 being convex in a paraxial region thereof and an image-side surface 212 being convex in a paraxial region thereof, which are both aspheric, and the first lens element 210 is made of plastic material.

The second lens element 220 with negative refractive power has an object-side surface 221 being concave in a paraxial region thereof and an image-side surface 222 being concave in a paraxial region thereof, which are both aspheric, and the second lens element 220 is made of plastic material.

The third lens element 230 with negative refractive power has an object-side surface 231 being concave in a paraxial region thereof and an image-side surface 232 being convex in a paraxial region thereof, which are both aspheric, and the third lens element 230 is made of plastic material.

The fourth lens element 240 with negative refractive power has an object-side surface 241 being concave in a paraxial region thereof and an image-side surface 242 being convex in a paraxial region thereof, which are both aspheric, and the fourth lens element 240 is made of plastic material.

The imaging optical system further includes a filter 250 located between the fourth lens element 240 and an image surface 260. The filter 250 is made of glass and will not affect the focal length of the imaging optical system. The image sensor 270 is disposed on or near the image surface 260 of the imaging optical system.

The detailed optical data of the 2nd embodiment are shown in TABLE 3, and the aspheric surface data are shown in TABLE 4, wherein the units of the curvature radius, the thickness and the focal length are expressed in mm, and HFOV is half of the maximal field of view.

TABLE 3

(2nd Embodiment)
f = 3.51 mm, Fno = 2.40, HFOV = 19.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.398 | ASP | 0.813 | Plastic | 1.530 | 55.8 | 2.01 |
| 2 | | −3.568 | ASP | −0.047 | | | | |
| 3 | Ape. Stop | Plano | | 0.129 | | | | |
| 4 | Lens 2 | −4.665 | ASP | 0.850 | Plastic | 1.661 | 20.4 | −4.45 |
| 5 | | 8.525 | ASP | 0.563 | | | | |
| 6 | Lens 3 | −20.111 | ASP | 0.413 | Plastic | 1.661 | 20.4 | −117.16 |
| 7 | | −27.390 | ASP | 0.182 | | | | |
| 8 | Lens 4 | −2.009 | ASP | 0.280 | Plastic | 1.544 | 55.9 | −3.80 |
| 9 | | −75.682 | ASP | 0.300 | | | | |
| 10 | Filter | Plano | | 0.100 | Glass | 1.517 | 64.2 | — |
| 11 | | Plano | | 0.233 | | | | |
| 12 | Image Surface | Plano | | — | | | | |

Note:
Reference wavelength is d-line 587.6 nm

TABLE 4

Aspheric Coefficients

| | Surface # | | | |
|---|---|---|---|---|
| | 1 | 2 | 4 | 5 |
| k = | −2.7056E+00 | 1.4070E+01 | 1.1603E+01 | −2.2115E+01 |
| A4 = | 9.3732E−02 | 1.2630E−01 | 4.1519E−02 | −3.3952E−02 |
| A6 = | −9.5139E−02 | −2.2282E+00 | −7.9395E−01 | 5.2885E−02 |
| A8 = | 2.2981E−01 | 1.6900E+01 | 6.9000E+00 | 3.1853E−02 |
| A10 = | −6.5664E−01 | −6.3639E+01 | −2.6885E+01 | −9.0983E−02 |
| A12 = | 8.2958E−01 | 1.1801E+02 | 5.1295E+01 | 3.0947E−02 |
| A14 = | −4.3758E−01 | −8.5044E+01 | −3.7711E+01 | 5.6204E−01 |

| | Surface # | | | |
|---|---|---|---|---|
| | 6 | 7 | 8 | 9 |
| k = | 5.0000E+01 | 4.4313E+01 | −2.6612E+00 | −1.0000E+00 |
| A4 = | −4.3708E−01 | −2.4670E−01 | −2.2959E−01 | −1.9906E−01 |
| A6 = | 2.3043E−01 | 2.0865E−01 | 1.9465E−01 | −1.3209E−01 |
| A8 = | −4.1803E+00 | −1.8380E+00 | −7.0578E−01 | 6.9158E−01 |
| A10 = | 1.4933E+01 | 4.8926E+00 | 2.4729E+00 | −9.3177E−01 |
| A12 = | −2.9411E+01 | −5.4362E+00 | −2.9474E+00 | 5.7729E−01 |
| A14 = | 2.2608E+01 | 2.2789E+00 | 1.1273E+00 | −1.4861E−01 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

2nd Embodiment

| f [mm] | 3.51 | TL [mm] | 3.82 |
|---|---|---|---|
| Fno | 2.40 | |(R6 + R7)/(R6 − R7)| | 1.16 |
| HFOV [deg.] | 19.0 | f1/|f4| | 0.53 |
| V2 + V3 | 40.8 | f2/f4 | 1.17 |
| CT1/(CT2 + CT3 + CT4) | 0.53 | |f2/f3| | 0.04 |

TABLE 5-continued

2nd Embodiment

| ΣCT/T23 | 4.18 | EPD/ImgH | 1.18 |
|---|---|---|---|
| T23/T34 | 3.09 | f/ImgH | 2.83 |
| BL/TL | 0.17 | SD11/SD42 | 0.83 |

3rd Embodiment

Figure 3A:
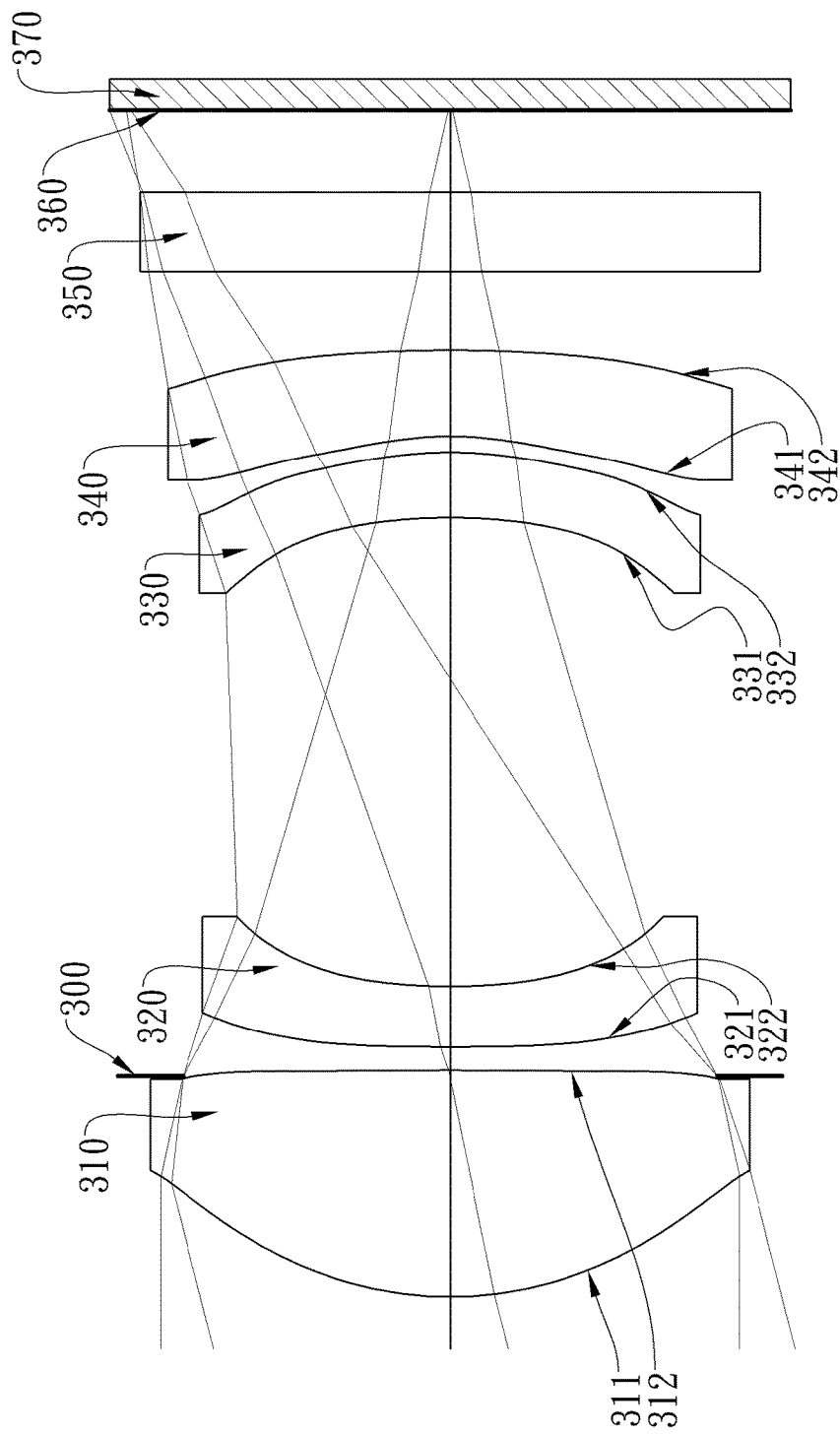
FIG. 3A is a schematic view of an image capturing apparatus according to the 3rd embodiment of the present disclosure.
Figure 3B:
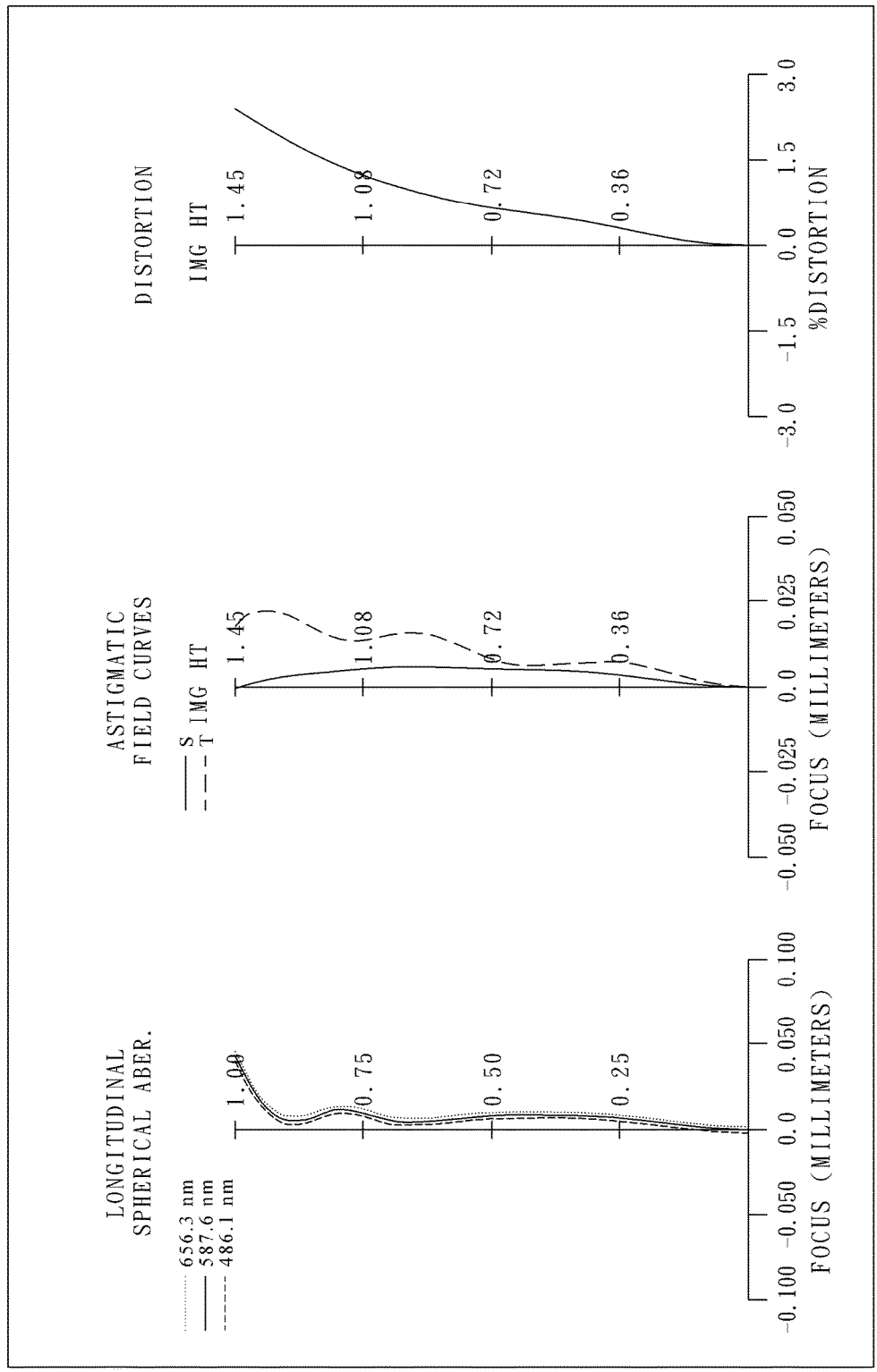
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes an imaging optical system (not otherwise herein labeled) of the present disclosure and an image sensor 370. The imaging optical system includes, in order from an object side to an image side: a first lens element 310, an aperture stop 300, a second lens element 320, a third lens element 330, and a fourth lens element 340. The imaging optical system has a total of four lens elements (310-340).

The first lens element 310 with positive refractive power has an object-side surface 311 being convex in a paraxial region thereof and an image-side surface 312 being convex in a paraxial region thereof, which are both aspheric, and the first lens element 310 is made of plastic material.

The second lens element 320 with negative refractive power has an object-side surface 321 being convex in a paraxial region thereof and an image-side surface 322 being concave in a paraxial region thereof, which are both aspheric, and the second lens element 320 is made of plastic material.

The third lens element 330 with positive refractive power has an object-side surface 331 being concave in a paraxial region thereof and an image-side surface 332 being convex in a paraxial region thereof, which are both aspheric, and the third lens element 330 is made of plastic material.

The fourth lens element 340 with negative refractive power has an object-side surface 341 being concave in a paraxial region thereof and an image-side surface 342 being convex in a paraxial region thereof, which are both aspheric, and the fourth lens element 340 is made of plastic material. Moreover, the fourth lens element 340 has at least one inflection point on the object-side surface 341 in an off-axial region thereof.

The imaging optical system further includes a filter 350 located between the fourth lens element 340 and an image surface 360. The filter 350 is made of glass and will not affect the focal length of the imaging optical system. The image sensor 370 is disposed on or near the image surface 360 of the imaging optical system.

The detailed optical data of the 3rd embodiment are shown in TABLE 6, and the aspheric surface data are shown in TABLE 7, wherein the units of the curvature radius, the thickness and the focal length are expressed in mm, and HFOV is half of the maximal field of view.

TABLE 6

(3rd Embodiment)
f = 4.99 mm, Fno = 2.27, HFOV = 14.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.386420 | ASP | 0.860 | Plastic | 1.537 | 55.9 | 2.52 |
| 2 | | -41.994200 | ASP | -0.022 | | | | |
| 3 | Ape. Stop | Plano | | 0.112 | | | | |
| 4 | Lens 2 | 11.827 | ASP | 0.230 | Plastic | 1.621 | 23.5 | -4.51 |
| 5 | | 2.245 | ASP | 1.783 | | | | |
| 6 | Lens 3 | -2.385 | ASP | 0.250 | Plastic | 1.621 | 23.5 | 5.61 |
| 7 | | -1.472 | ASP | 0.061 | | | | |
| 8 | Lens 4 | -1.176 | ASP | 0.327 | Plastic | 1.537 | 55.9 | -2.94 |
| 9 | | -5.081 | ASP | 0.300 | | | | |
| 10 | Filter | Plano | | 0.300 | Glass | 1.510 | 64.2 | — |
| 11 | | Plano | | 0.314 | | | | |
| 12 | Image Surface | Plano | | — | | | | |

Note:
Reference wavelength is 830 nm

TABLE 7

Aspheric Coefficients

| | Surface # | | | |
|---|---|---|---|---|
| | 1 | 2 | 4 | 5 |
| k = | -4.0411E+00 | 4.5301E+01 | 6.3303E+00 | 1.3256E+00 |
| A4 = | 1.7698E-01 | -3.8127E-02 | 9.8169E-02 | 2.2540E-01 |
| A6 = | -1.3880E-01 | 3.0757E-01 | 1.5353E-01 | -5.6489E-01 |
| A8 = | 1.9652E-01 | -6.6123E-01 | 6.7250E-02 | 3.5939E+00 |
| A10 = | -2.3023E-01 | 5.8479E-01 | -1.0589E+00 | -9.5683E+00 |
| A12 = | 1.4863E-01 | -2.4493E-01 | 1.4333E+00 | 1.2065E+01 |
| A14 = | -4.4250E-02 | 3.6383E-02 | -5.7729E-01 | -5.6126E+00 |

| | Surface # | | | |
|---|---|---|---|---|
| | 6 | 7 | 8 | 9 |
| k = | -5.1134E+00 | -3.6283E+00 | -9.1103E-01 | 1.4423E+01 |
| A4 = | -2.7450E-01 | 3.6858E-01 | 9.5903E-01 | 1.6075E-01 |
| A6 = | 4.0331E-01 | -3.1931E-01 | -1.6811E+00 | -6.4550E-01 |
| A8 = | -1.4688E+00 | -1.4340E+00 | 1.1657E+00 | 1.0136E+00 |
| A10 = | 9.5696E-01 | 2.3987E+00 | 1.2030E-01 | -8.0991E-01 |
| A12 = | 9.8274E-01 | -1.0675E+00 | -4.1727E-01 | 3.2180E-01 |
| A14 = | -8.3505E-01 | 7.7026E-02 | 1.1782E-01 | -4.5561E-02 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

3rd Embodiment

| | | | |
|---|---|---|---|
| f [mm] | 4.99 | TL [mm] | 4.51 |
| Fno | 2.27 | |(R6 + R7)/(R6 − R7)| | 8.96 |
| HFOV [deg.] | 14.2 | f1/|f4| | 0.86 |
| V2 + V3 | 47.0 | f2/f4 | 1.53 |
| CT1/(CT2 + CT3 + CT4) | 1.07 | |f2/f3| | 0.80 |
| ΣCT/T23 | 0.93 | EPD/ImgH | 1.70 |
| T23/T34 | 29.23 | f/ImgH | 3.85 |
| BL/TL | 0.20 | SD11/SD42 | 1.06 |

4th Embodiment

Figure 4A:
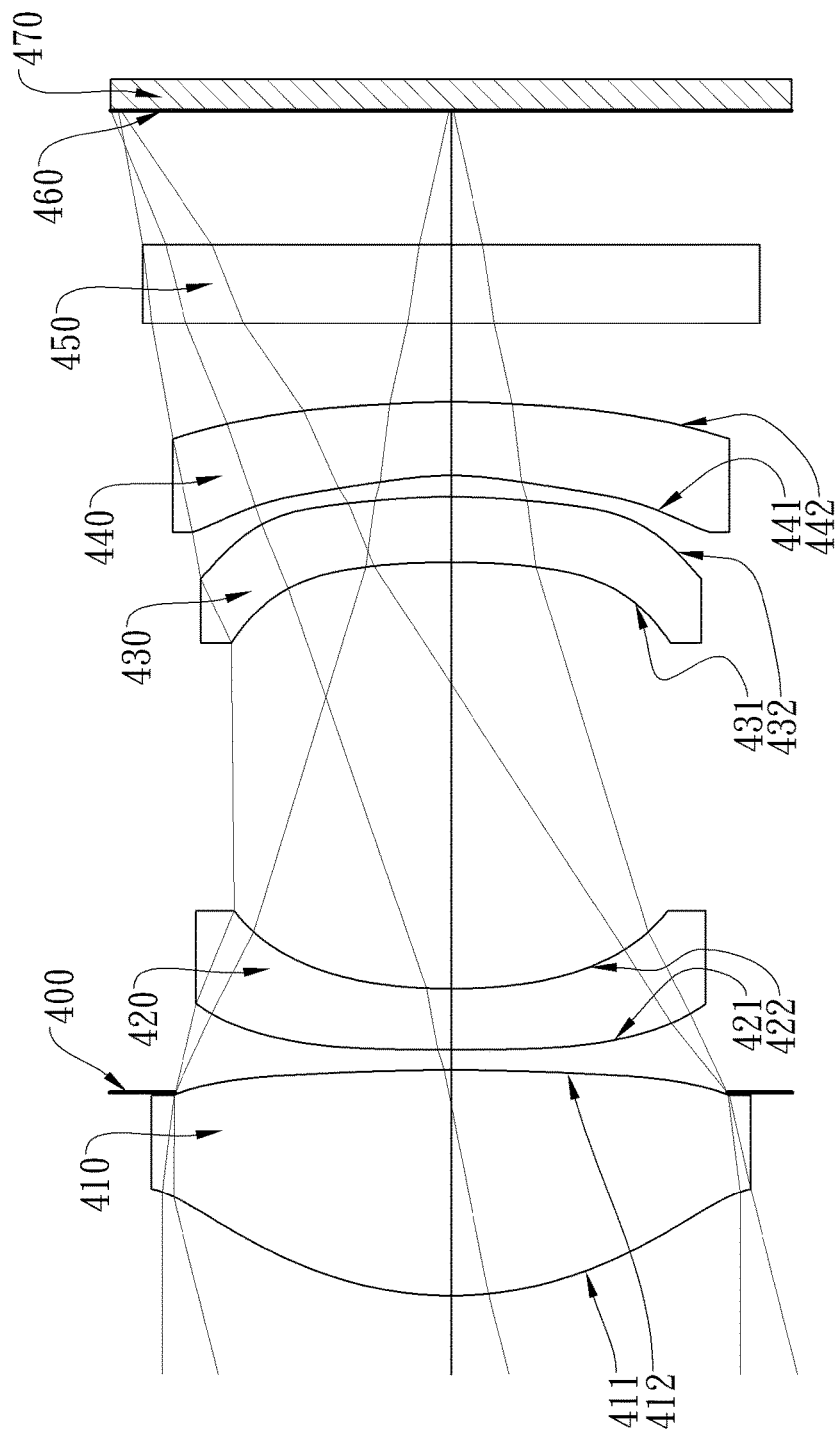
FIG. 4A is a schematic view of an image capturing apparatus according to the 4th embodiment of the present disclosure.
Figure 4B:
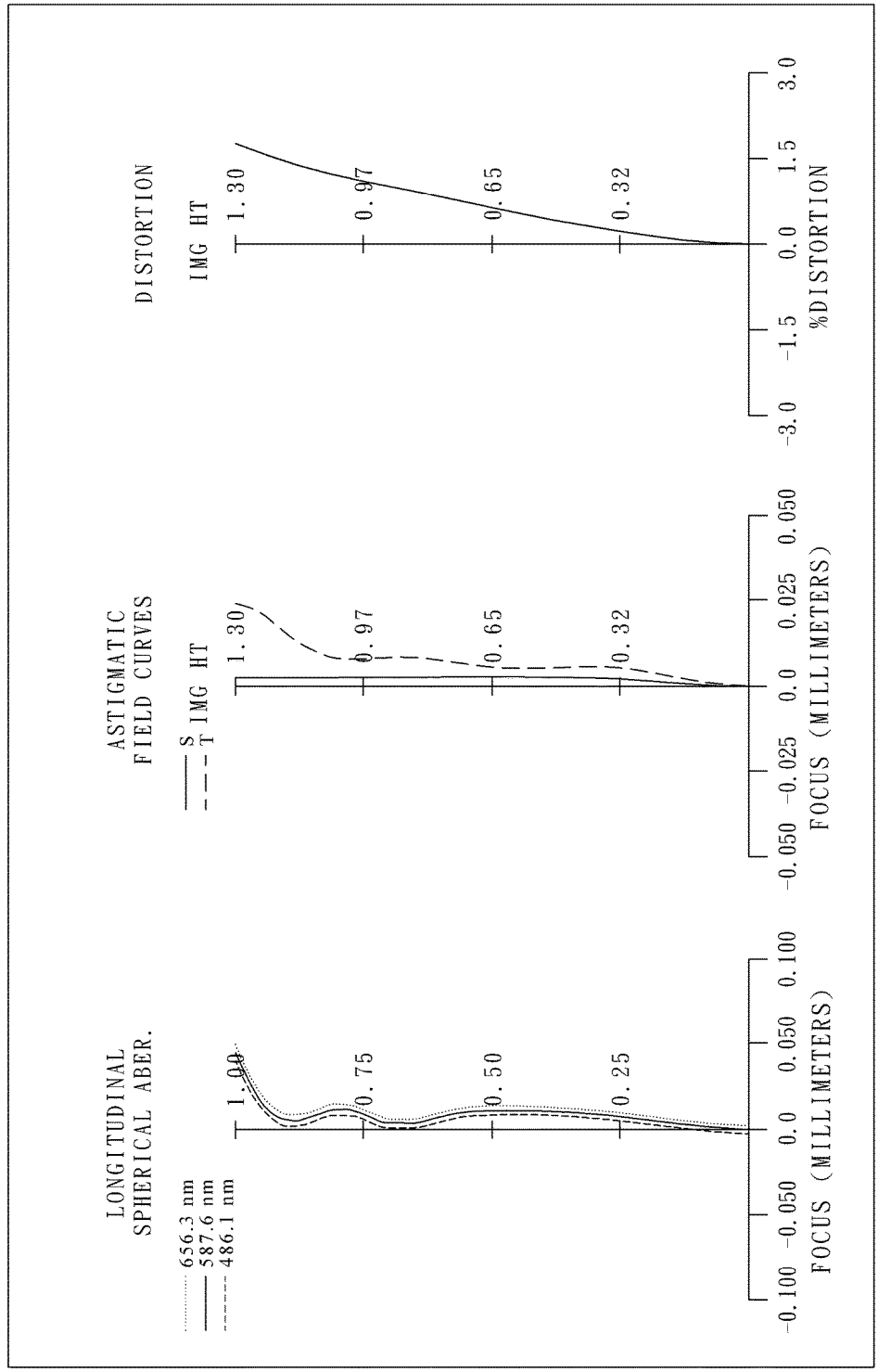
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes an imaging optical system (not otherwise herein labeled) of the present disclosure and an image sensor 470. The imaging optical system includes, in order from an object side to an image side: a first lens element 410, an aperture stop 400, a second lens element 420, a third lens element 430, and a fourth lens element 440. The imaging optical system has a total of four lens elements (410-440).

The first lens element 410 with positive refractive power has an object-side surface 411 being convex in a paraxial region thereof and an image-side surface 412 being convex in a paraxial region thereof, which are both aspheric, and the first lens element 410 is made of plastic material.

The second lens element 420 with negative refractive power has an object-side surface 421 being convex in a paraxial region thereof and an image-side surface 422 being concave in a paraxial region thereof, which are both aspheric, and the second lens element 420 is made of plastic material.

The third lens element 430 with positive refractive power has an object-side surface 431 being concave in a paraxial region thereof and an image-side surface 432 being convex in a paraxial region thereof, which are both aspheric, and the third lens element 430 is made of plastic material.

The fourth lens element 440 with negative refractive power has an object-side surface 441 being concave in a paraxial region thereof and an image-side surface 442 being convex in a paraxial region thereof, which are both aspheric, and the fourth lens element 440 is made of plastic material. Moreover, the fourth lens element 440 has at least one inflection point on the object-side surface 441 in an off-axial region thereof.

The imaging optical system further includes a filter 450 located between the fourth lens element 440 and an image surface 460. The filter 450 is made of glass and will not affect the focal length of the imaging optical system. The image sensor 470 is disposed on or near the image surface 460 of the imaging optical system.

The detailed optical data of the 4th embodiment are shown in TABLE 9, and the aspheric surface data are shown in TABLE 10, wherein the units of the curvature radius, the thickness and the focal length are expressed in mm, and HFOV is half of the maximal field of view.

TABLE 9

(4th Embodiment)
f = 4.99 mm, Fno = 2.27, HFOV = 14.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.419 | ASP | 0.860 | Plastic | 1.528 | 55.7 | 2.39 |
| 2 | | −9.120 | ASP | −0.086 | | | | |
| 3 | Ape. Stop | Plano | | 0.162 | | | | |
| 4 | Lens 2 | 11.952 | ASP | 0.232 | Plastic | 1.621 | 23.5 | −4.13 |
| 5 | | 2.093 | ASP | 1.626 | | | | |
| 6 | Lens 3 | −3.567 | ASP | 0.250 | Plastic | 1.621 | 23.5 | 10.64 |
| 7 | | −2.378 | ASP | 0.080 | | | | |
| 8 | Lens 4 | −1.300 | ASP | 0.280 | Plastic | 1.537 | 55.9 | −3.80 |
| 9 | | −3.861 | ASP | 0.300 | | | | |
| 10 | Filter | Plano | | 0.300 | Glass | 1.510 | 64.2 | — |
| 11 | | Plano | | 0.510 | | | | |
| 12 | Image Surface | Plano | | — | | | | |

Note:
Reference wavelength is 830 nm

TABLE 10

Aspheric Coefficients

| | Surface # | | | |
|---|---|---|---|---|
| | 1 | 2 | 4 | 5 |
| k = | −4.4721E+00 | 8.4850E+00 | 4.8894E+01 | 1.0795E+00 |
| A4 = | 1.7790E−01 | −3.1581E−02 | 9.0735E−02 | 2.0031E−01 |
| A6 = | −1.7115E−01 | 2.7897E−01 | 1.9450E−01 | −5.3754E−01 |
| A8 = | 2.0481E−01 | −6.1422E−01 | 1.1442E−01 | 3.7872E+00 |
| A10 = | −2.0709E−01 | 5.1376E−01 | −1.2658E+00 | −1.0451E+01 |
| A12 = | 1.0085E−01 | −1.8667E−01 | 1.7023E+00 | 1.3530E+01 |
| A14 = | −2.3594E−02 | 1.9900E−02 | −6.8302E−01 | −6.4325E+00 |

| | Surface # | | | |
|---|---|---|---|---|
| | 6 | 7 | 8 | 9 |
| k = | −3.1159E+00 | −1.8026E−01 | −3.5734E−01 | −1.0419E+00 |
| A4 = | −1.9238E−01 | 4.4412E−01 | 9.3218E−01 | 1.8460E−01 |
| A6 = | −1.1593E−01 | −6.9561E−01 | −1.4440E+00 | −5.8474E−01 |
| A8 = | −1.3999E+00 | −1.1681E+00 | 7.2257E−01 | 8.5458E−01 |
| A10 = | 3.9815E+00 | 2.7710E+00 | −2.0600E−02 | −6.4057E−01 |
| A12 = | −5.7848E+00 | −2.2943E+00 | 1.0073E−01 | 1.9913E−01 |
| A14 = | 3.2345E+00 | 8.0194E−01 | −7.9213E−02 | −6.3669E−03 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

4th Embodiment

| f [mm] | 4.99 | TL [mm] | 4.51 |
|---|---|---|---|
| Fno | 2.27 | |(R6 + R7)/(R6 − R7)| | 3.41 |
| HFOV [deg.] | 14.3 | f1/|f4| | 0.63 |
| V2 + V3 | 47.0 | f2/f4 | 1.09 |
| CT1/(CT2 + CT3 + CT4) | 1.13 | |f2/f3| | 0.39 |
| ΣCT/T23 | 1.00 | EPD/ImgH | 1.70 |
| T23/T34 | 20.33 | f/ImgH | 3.85 |
| BL/TL | 0.25 | SD11/SD42 | 1.08 |

5th Embodiment

Figure 5A:
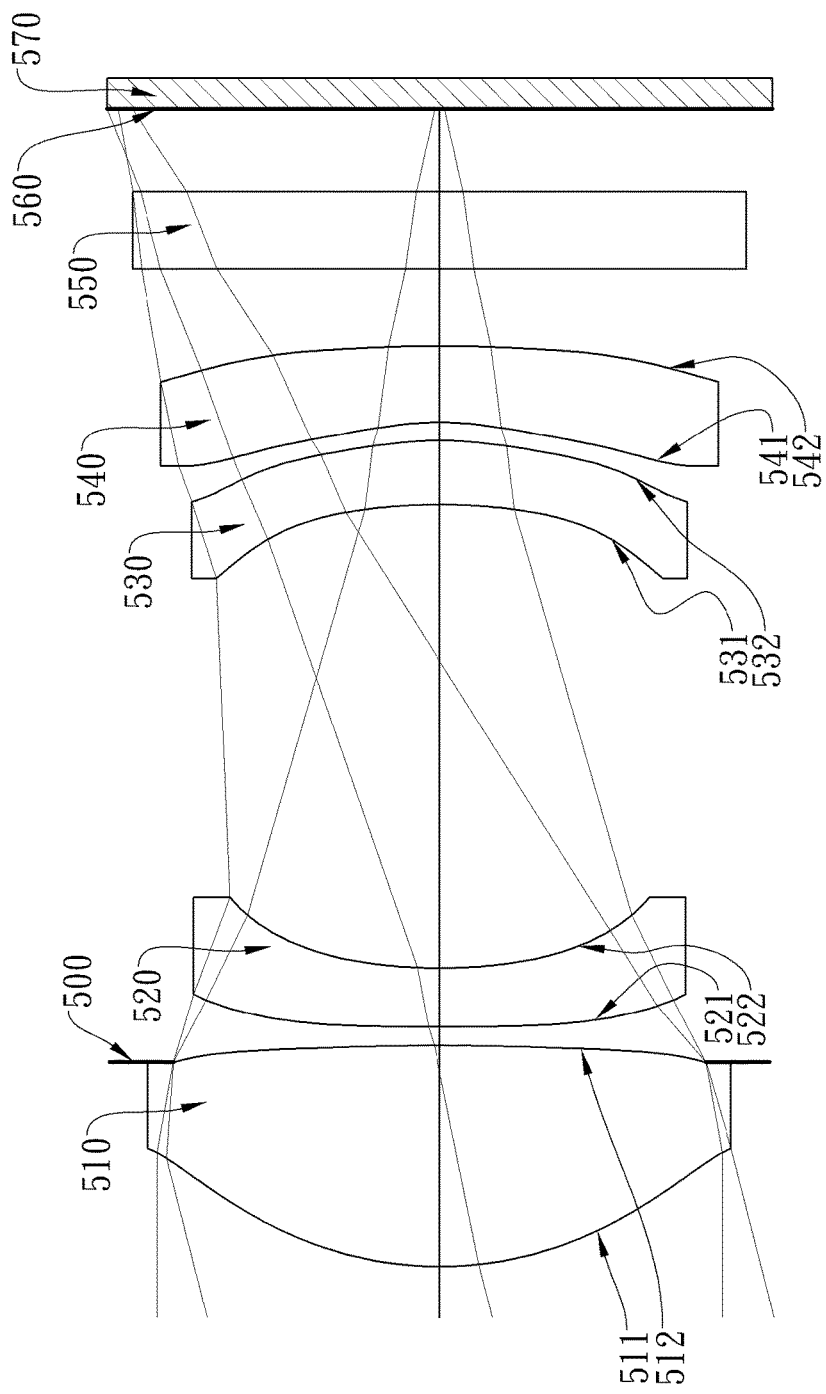
FIG. 5A is a schematic view of an image capturing apparatus according to the 5th embodiment of the present disclosure.
Figure 5B:
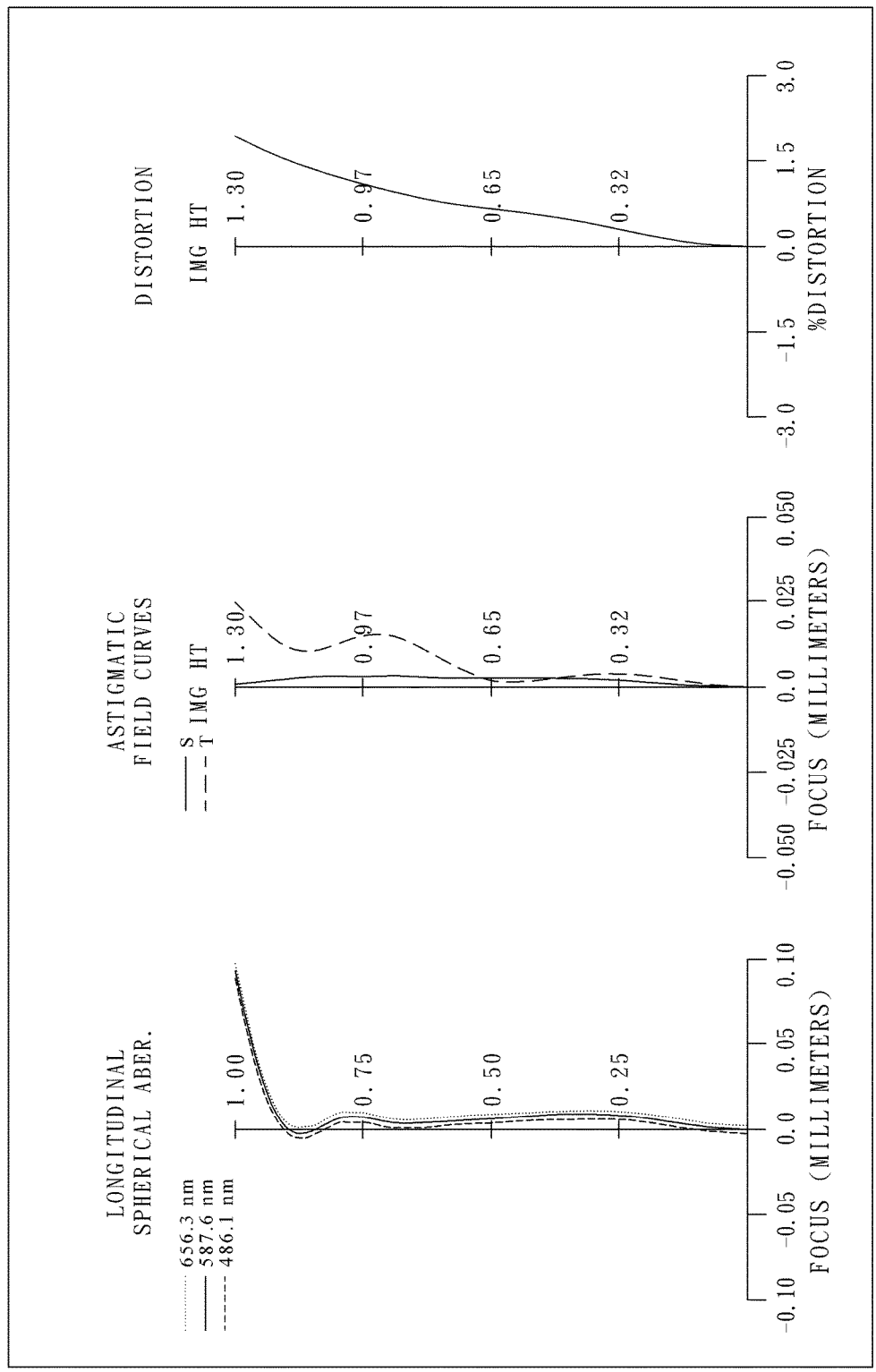
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes an imaging optical system (not otherwise herein labeled) of the present disclosure and an image sensor 570. The imaging optical system includes, in order from an object side to an image side: a first lens element 510, an aperture stop 500, a second lens element 520, a third lens element 530, and a fourth lens element 540. The imaging optical system has a total of four lens elements (510-540).

The first lens element 510 with positive refractive power has an object-side surface 511 being convex in a paraxial region thereof and an image-side surface 512 being convex in a paraxial region thereof, which are both aspheric, and the first lens element 510 is made of plastic material.

The second lens element 520 with negative refractive power has an object-side surface 521 being convex in a paraxial region thereof and an image-side surface 522 being concave in a paraxial region thereof, which are both aspheric, and the second lens element 520 is made of plastic material.

The third lens element 530 with positive refractive power has an object-side surface 531 being concave in a paraxial region thereof and an image-side surface 532 being convex in a paraxial region thereof, which are both aspheric, and the third lens element 530 is made of plastic material.

The fourth lens element 540 with negative refractive power has an object-side surface 541 being concave in a paraxial region thereof and an image-side surface 542 being convex in a paraxial region thereof, which are both aspheric, and the fourth lens element 540 is made of plastic material. Moreover, the fourth lens element 540 has at least one inflection point on the object-side surface 541 in an off-axial region thereof.

The imaging optical system further includes a filter 550 located between the fourth lens element 540 and an image surface 560. The filter 550 is made of glass and will not affect the focal length of the imaging optical system. The image sensor 570 is disposed on or near the image surface 560 of the imaging optical system.

The detailed optical data of the 5th embodiment are shown in TABLE 12, and the aspheric surface data are shown in TABLE 13, wherein the units of the curvature radius, the thickness and the focal length are expressed in mm, and HFOV is half of the maximal field of view.

TABLE 12

(5th Embodiment)
f = 4.99 mm, Fno = 2.27, HFOV = 14.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.383 | ASP | 0.860 | Plastic | 1.528 | 55.7 | 2.40 |
| 2 | | −11.614 | ASP | −0.064 | | | | |
| 3 | Ape. Stop | Plano | | 0.138 | | | | |
| 4 | Lens 2 | 19.151 | ASP | 0.230 | Plastic | 1.621 | 23.5 | −4.01 |
| 5 | | 2.193 | ASP | 1.804 | | | | |
| 6 | Lens 3 | −2.443 | ASP | 0.250 | Plastic | 1.621 | 23.5 | 5.50 |
| 7 | | −1.480 | ASP | 0.072 | | | | |
| 8 | Lens 4 | −1.183 | ASP | 0.297 | Plastic | 1.537 | 55.9 | −2.87 |
| 9 | | −5.540 | ASP | 0.300 | | | | |
| 10 | Filter | Plano | | 0.300 | Glass | 1.510 | 64.2 | — |
| 11 | | Plano | | 0.325 | | | | |
| 12 | Image Surface | Plano | | — | | | | |

Note:
Reference wavelength is 830 nm

TABLE 13

Aspheric Coefficients

| | Surface # | | | |
|---|---|---|---|---|
| | 1 | 2 | 4 | 5 |
| k = | −3.9677E+00 | −2.8163E+01 | −3.4190E+01 | 1.0795E+00 |
| A4 = | 1.7705E−01 | −3.5031E−02 | 8.7980E−02 | 2.2163E−01 |
| A6 = | −1.4818E−01 | 2.9858E−01 | 1.6431E−01 | −6.7621E−01 |
| A8 = | 2.0438E−01 | −6.3033E−01 | 7.4241E−02 | 4.1464E+00 |
| A10 = | −2.3004E−01 | 5.2057E−01 | −1.0771E+00 | −1.0912E+01 |
| A12 = | 1.3940E−01 | −1.8652E−01 | 1.4644E+00 | 1.3721E+01 |
| A14 = | −4.1041E−02 | 1.7669E−02 | −5.8924E−01 | −6.3813E+00 |

| | Surface # | | | |
|---|---|---|---|---|
| | 6 | 7 | 8 | 9 |
| k = | −1.2761E+01 | −4.4131E+00 | −8.7313E−01 | 1.4364E+01 |
| A4 = | −2.5834E−01 | 3.5897E−01 | 9.5515E−01 | 2.0316E−01 |
| A6 = | 2.8842E−01 | −2.3278E−01 | −1.6531E+00 | −8.2414E−01 |
| A8 = | −1.2994E+00 | −1.7540E+00 | 1.0670E+00 | 1.3437E+00 |
| A10 = | 8.6391E−01 | 2.8685E+00 | 2.4991E−01 | −1.1589E+00 |
| A12 = | 9.4413E−01 | −1.3865E+00 | −4.8928E−01 | 5.1786E−01 |
| A14 = | −7.7764E−01 | 1.6032E−01 | 1.3124E−01 | −9.1326E−02 |

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with corresponding values for the 5th embodiment, so an explanation in this regard will not be provided again.

Moreover, these parameters can be calculated from TABLE 12 and TABLE 13 and satisfy the conditions stated in TABLE 14.

TABLE 14

5th Embodiment

| f [mm] | 4.99 | TL [mm] | 4.51 |
|---|---|---|---|
| Fno | 2.27 | |(R6 + R7)/(R6 − R7)| | 8.99 |
| HFOV [deg.] | 14.2 | f1/|f4| | 0.84 |
| V2 + V3 | 47.0 | f2/f4 | 1.40 |
| CT1/(CT2 + CT3 + CT4) | 1.11 | |f2/f3| | 0.73 |

TABLE 14-continued

5th Embodiment

| ΣCT/T23 | 0.91 | EPD/ImgH | 1.70 |
|---|---|---|---|
| T23/T34 | 25.06 | f/ImgH | 3.85 |
| BL/TL | 0.21 | SD11/SD42 | 1.05 |

6th Embodiment

Figure 6A:
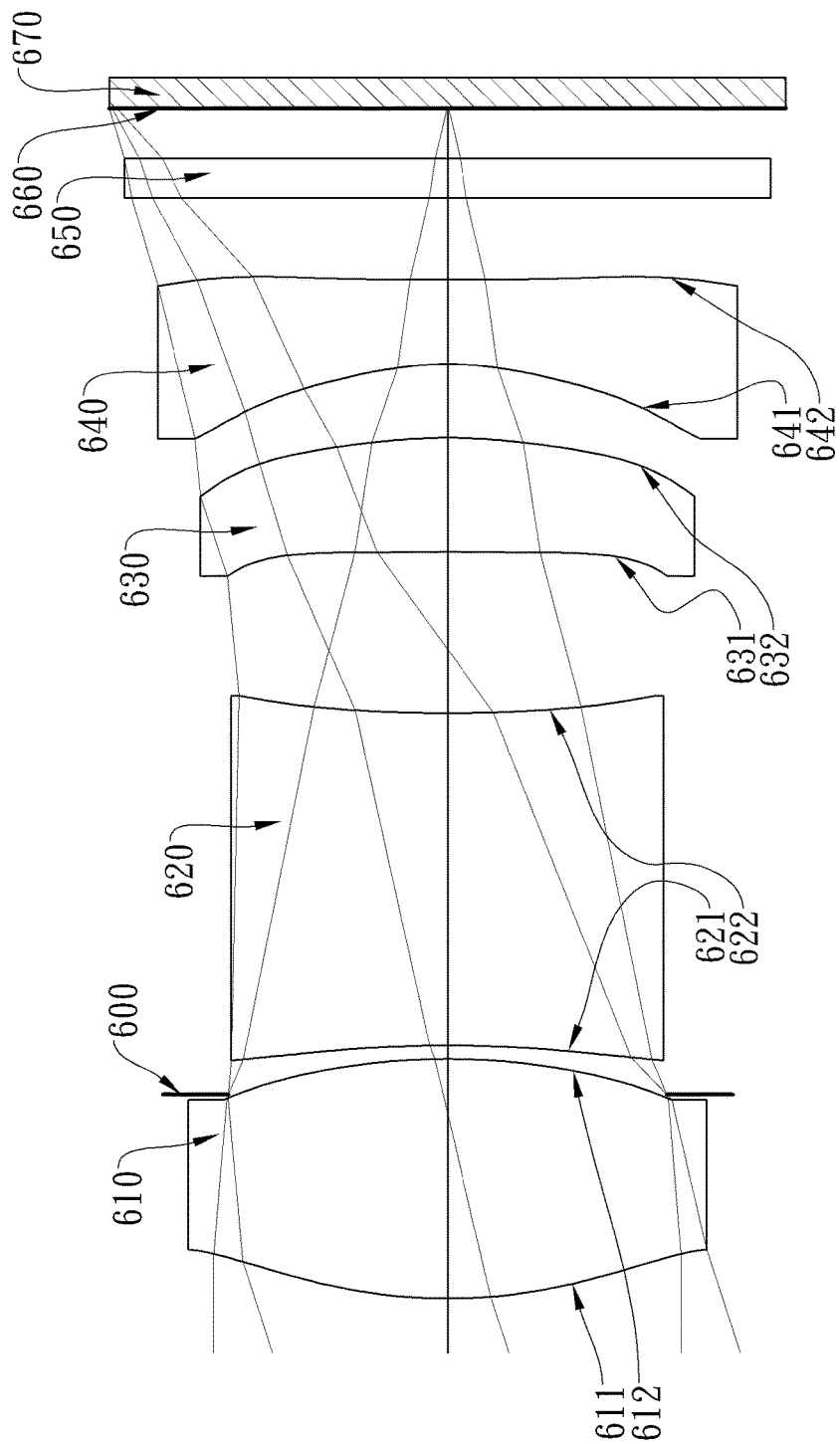
FIG. 6A is a schematic view of an image capturing apparatus according to the 6th embodiment of the present disclosure.
Figure 6B:
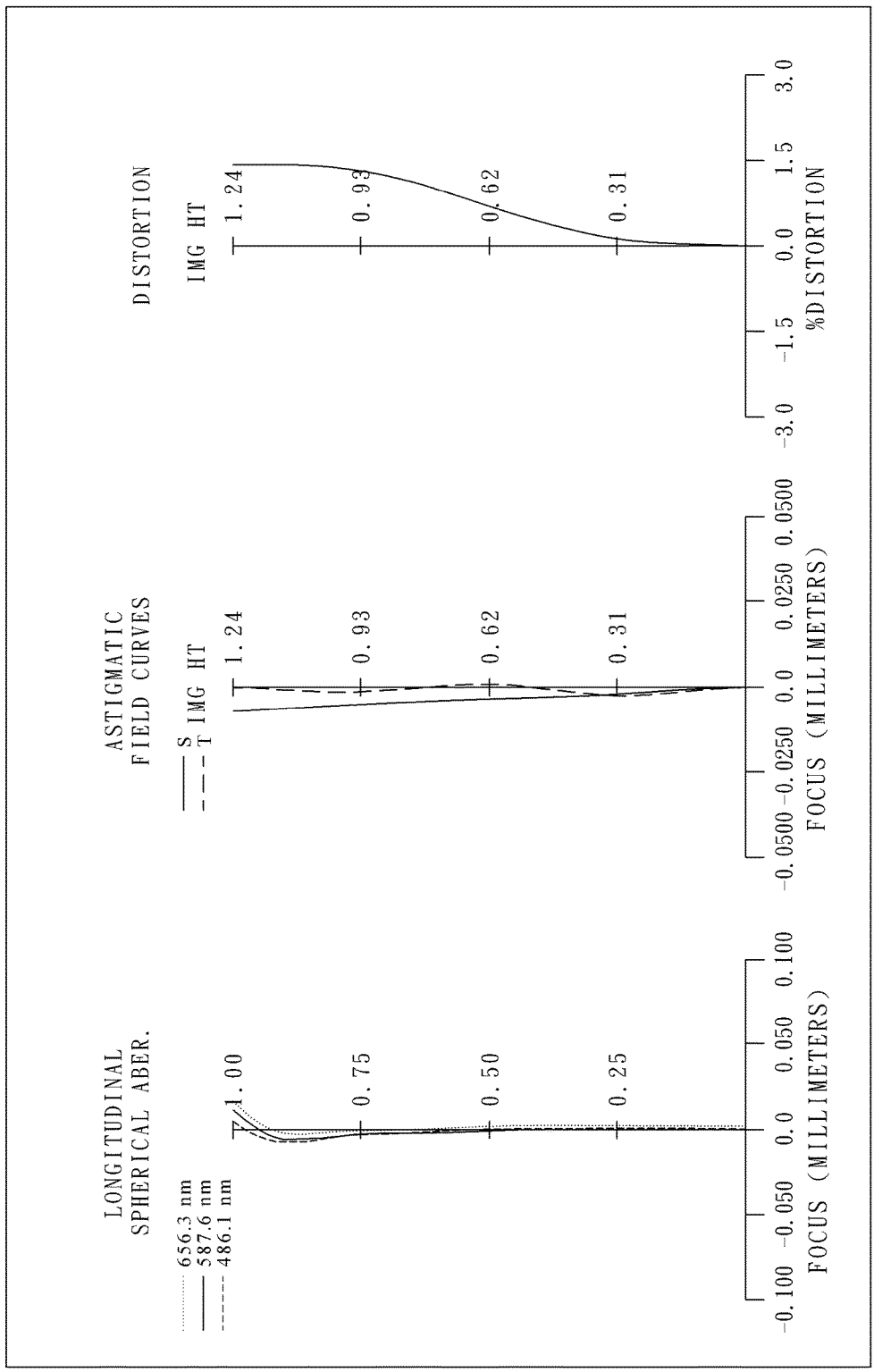
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes an imaging optical system (not otherwise herein labeled) of the present disclosure and an image sensor 670. The imaging optical system includes, in order from an object side to an image side: a first lens element 610, an aperture stop 600, a second lens element 620, a third lens element 630, and a fourth lens element 640. The imaging optical system has a total of four lens elements (610-640).

The first lens element 610 with positive refractive power has an object-side surface 611 being convex in a paraxial region thereof and an image-side surface 612 being convex in a paraxial region thereof, which are both aspheric, and the first lens element 610 is made of plastic material.

The second lens element 620 with negative refractive power has an object-side surface 621 being concave in a paraxial region thereof and an image-side surface 622 being concave in a paraxial region thereof, which are both aspheric, and the second lens element 620 is made of plastic material.

The third lens element 630 with positive refractive power has an object-side surface 631 being concave in a paraxial region thereof and an image-side surface 632 being convex in a paraxial region thereof, which are both aspheric, and the third lens element 630 is made of plastic material.

The fourth lens element 640 with negative refractive power has an object-side surface 641 being concave in a paraxial region thereof and an image-side surface 642 being convex in a paraxial region thereof, which are both aspheric, and the fourth lens element 640 is made of plastic material. Moreover, the fourth lens element 640 has at least one inflection point on the object-side surface 641 in an off-axial region thereof.

The imaging optical system further includes a filter 650 located between the fourth lens element 640 and an image surface 660. The filter 650 is made of glass and will not affect the focal length of the imaging optical system. The image sensor 670 is disposed on or near the image surface 660 of the imaging optical system.

The detailed optical data of the 6th embodiment are shown in TABLE 15, and the aspheric surface data are shown in TABLE 16, wherein the units of the curvature radius, the thickness and the focal length are expressed in mm, and HFOV is half of the maximal field of view.

TABLE 15

(6th Embodiment)
f = 3.76 mm, Fno = 2.18, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.900 | ASP | 0.886 | Plastic | 1.544 | 55.9 | 2.16 |
| 2 | | −2.573 | ASP | −0.131 | | | | |
| 3 | Ape. Stop | Plano | | 0.181 | | | | |
| 4 | Lens 2 | −4.529 | ASP | 1.228 | Plastic | 1.639 | 23.5 | −3.73 |
| 5 | | 5.560 | ASP | 0.597 | | | | |
| 6 | Lens 3 | −98.696 | ASP | 0.422 | Plastic | 1.639 | 23.5 | 3.36 |
| 7 | | −2.105 | ASP | 0.273 | | | | |
| 8 | Lens 4 | −1.169 | ASP | 0.313 | Plastic | 1.639 | 23.5 | −1.88 |
| 9 | | −46.895 | ASP | 0.300 | | | | |
| 10 | Filter | Plano | | 0.145 | Glass | 1.517 | 64.2 | — |
| 11 | | Plano | | 0.186 | | | | |
| 12 | Image Surface | Plano | | — | | | | |

Note:
Reference wavelength is d-line 587.6 nm

TABLE 16

Aspheric Coefficients

| | Surface # | | | |
|---|---|---|---|---|
| | 1 | 2 | 4 | 5 |
| k = | −8.6344E+00 | −1.6664E−01 | 7.3367E+00 | −5.8950E+00 |
| A4 = | 1.1810E−01 | −4.9180E−03 | 4.6047E−02 | 3.8684E−02 |
| A6 = | −1.5522E−01 | −4.3174E−02 | −3.8049E−02 | −1.0388E−03 |
| A8 = | 8.9876E−02 | 5.4520E−03 | 2.3806E−01 | −8.7572E−02 |
| A10 = | −6.2031E−02 | | −6.8427E−01 | 4.6237E−01 |
| A12 = | | | 1.0061E+00 | −8.0735E−01 |
| A14 = | | | −5.4647E−01 | 4.6280E−01 |

| | Surface # | | | |
|---|---|---|---|---|
| | 6 | 7 | 8 | 9 |
| k = | −1.0000E+00 | 3.2467E+00 | −3.3326E+00 | −1.0000E+00 |
| A4 = | −3.8483E−02 | 2.4327E−01 | 4.1416E−01 | 2.5780E−01 |
| A6 = | 6.3615E−02 | 3.3698E−01 | −8.3842E−01 | −6.3614E−01 |
| A8 = | −9.0359E−01 | −2.4048E+00 | 3.2452E−01 | 6.3318E−01 |
| A10 = | 1.1830E+00 | 4.0316E+00 | 5.1742E−02 | −3.5700E−01 |
| A12 = | −7.7481E−01 | −3.2500E+00 | 2.4397E−01 | 1.1654E−01 |
| A14 = | | 1.1449E+00 | −1.7814E−01 | −1.6691E−02 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

| 6th Embodiment | | | |
|---|---|---|---|
| f [mm] | 3.76 | TL [mm] | 4.40 |
| Fno | 2.18 | |(R6 + R7)/(R6 − R7)| | 3.50 |
| HFOV [deg.] | 18.0 | f1/|f4| | 1.15 |
| V2 + V3 | 47.0 | f2/f4 | 1.98 |
| CT1/(CT2 + CT3 + CT4) | 0.45 | |f2/f3| | 1.11 |
| ΣCT/T23 | 4.77 | EPD/ImgH | 1.39 |
| T23/T34 | 2.19 | f/ImgH | 3.03 |
| BL/TL | 0.14 | SD11/SD42 | 0.89 |

7th Embodiment

Figure 7A:
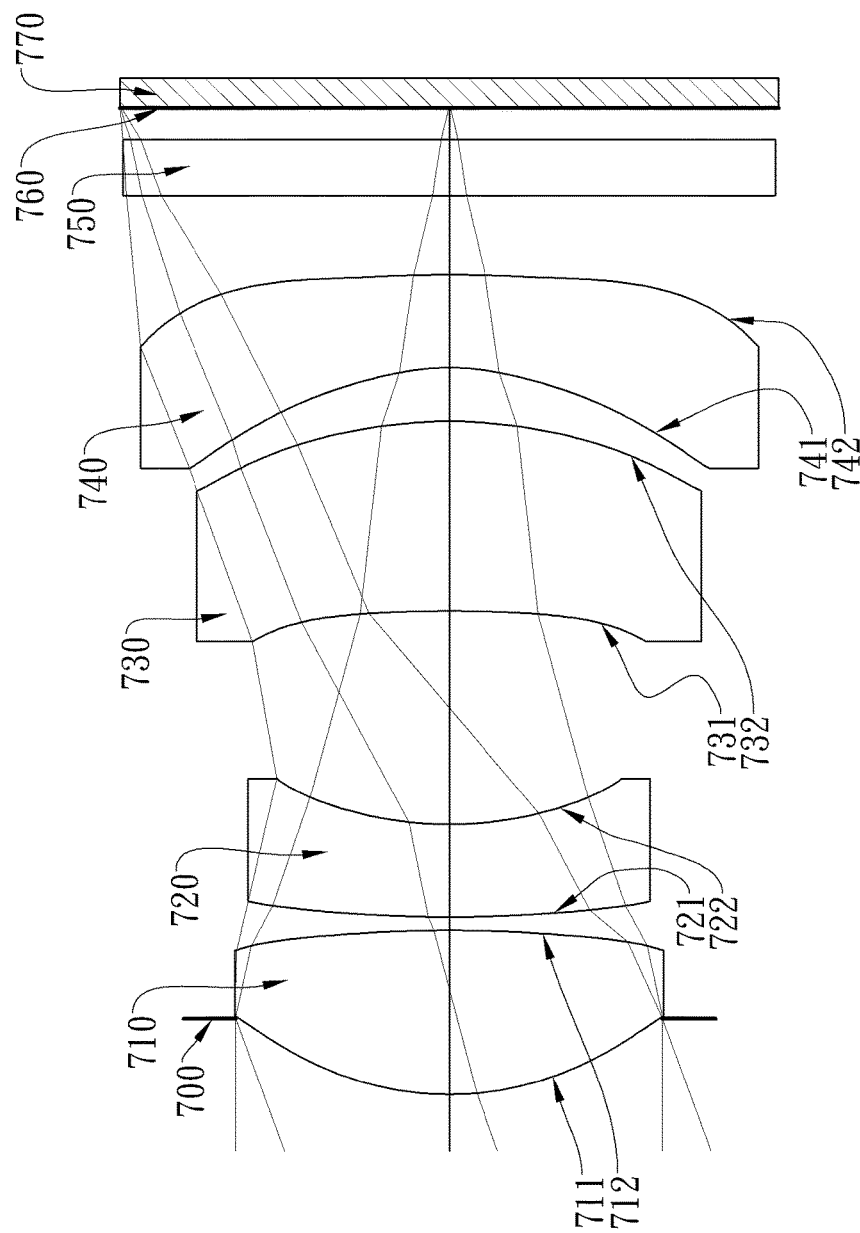
FIG. 7A is a schematic view of an image capturing apparatus according to the 7th embodiment of the present disclosure.
Figure 7B:
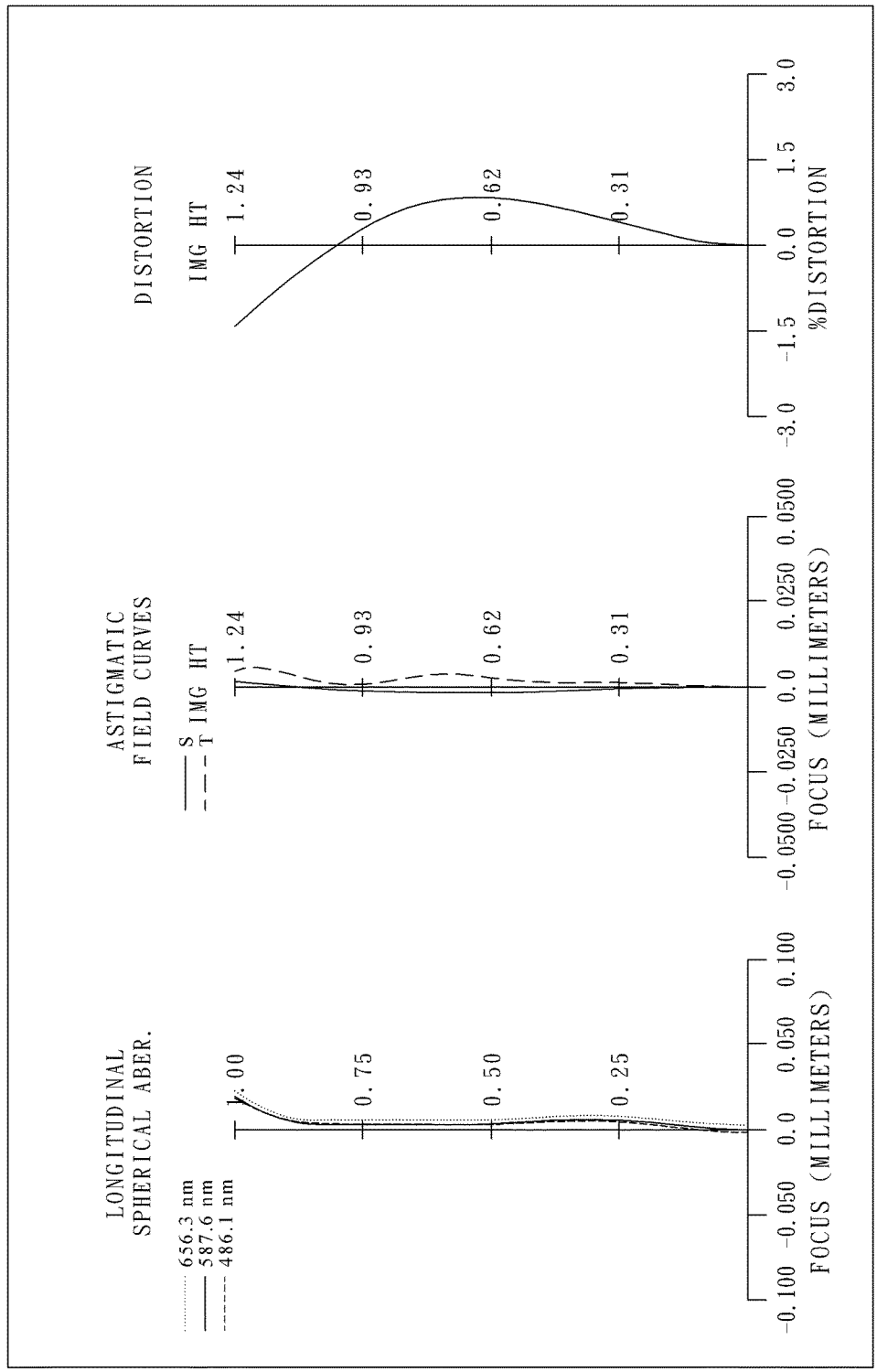
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes an imaging optical system (not otherwise herein labeled) of the present disclosure and an image sensor 770. The imaging optical system includes, in order from an object side to an image side: an aperture stop 700, a first lens element 710, a second lens element 720, a third lens element 730, and a fourth lens element 740. The imaging optical system has a total of four lens elements (710-740).

The first lens element 710 with positive refractive power has an object-side surface 711 being convex in a paraxial region thereof and an image-side surface 712 being convex in a paraxial region thereof, which are both aspheric, and the first lens element 710 is made of glass.

The second lens element 720 with negative refractive power has an object-side surface 721 being convex in a paraxial region thereof and an image-side surface 722 being concave in a paraxial region thereof, which are both aspheric, and the second lens element 720 is made of glass.

The third lens element 730 with positive refractive power has an object-side surface 731 being concave in a paraxial region thereof and an image-side surface 732 being convex in a paraxial region thereof, which are both aspheric, and the third lens element 730 is made of glass.

The fourth lens element 740 with negative refractive power has an object-side surface 741 being concave in a paraxial region thereof and an image-side surface 742 being convex in a paraxial region thereof, which are both aspheric, and the fourth lens element 740 is made of glass. Moreover, the fourth lens element 740 has at least one inflection point on the object-side surface 741 in an off-axial region thereof.

The imaging optical system further includes a filter 750 located between the fourth lens element 740 and an image surface 760. The filter 750 is made of glass and will not affect the focal length of the imaging optical system. The image sensor 770 is disposed on or near the image surface 760 of the imaging optical system.

The detailed optical data of the 7th embodiment are shown in TABLE 18, and the aspheric surface data are shown in TABLE 19, wherein the units of the curvature radius, the thickness and the focal length are expressed in mm, and HFOV is half of the maximal field of view.

TABLE 18

(7th Embodiment)
f = 3.45 mm, Fno = 2.15, HFOV = 20.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.287 | | | | |
| 2 | Lens 1 | 1.149 | ASP | 0.619 | Glass | 1.542 | 62.9 | 1.81 |
| 3 | | −5.397 | ASP | 0.050 | | | | |
| 4 | Lens 2 | 4.467 | ASP | 0.350 | Glass | 1.844 | 24.8 | −2.51 |
| 5 | | 1.386 | ASP | 0.804 | | | | |
| 6 | Lens 3 | −6.731 | ASP | 0.717 | Glass | 1.810 | 40.9 | 2.78 |
| 7 | | −1.770 | ASP | 0.202 | | | | |
| 8 | Lens 4 | −0.923 | ASP | 0.350 | Glass | 1.518 | 63.5 | −2.34 |
| 9 | | −4.355 | ASP | 0.300 | | | | |
| 10 | Filter | Plano | | 0.210 | Glass | 1.517 | 64.2 | — |
| 11 | | Plano | | 0.119 | | | | |
| 12 | Image Surface | Plano | | — | | | | |

Note:
Reference wavelength is d-line 587.6 nm

TABLE 19

Aspheric Coefficients

| Surface # | | | | |
|---|---|---|---|---|
| | 2 | 3 | 4 | 5 |
| k = | −2.2791E+00 | 1.2495E+01 | −3.5914E+01 | −4.8833E−01 |
| A4 = | 1.6380E−01 | 2.8711E−03 | −6.3327E−02 | −6.5232E−02 |
| A6 = | 5.6593E−03 | 1.8196E−01 | 2.7723E−01 | 1.3203E−01 |
| A8 = | −2.0460E−01 | −6.9411E−01 | −4.7083E−01 | 1.7700E+00 |
| A10 = | 3.4207E−01 | 1.0676E+00 | 3.4350E−01 | −8.5280E+00 |
| A12 = | −2.0685E−01 | −1.0943E+00 | 3.2944E−01 | 2.0221E+01 |
| A14 = | −2.0054E−01 | 4.3787E−01 | −3.3347E−01 | −1.6229E+01 |

| Surface # | | | | |
|---|---|---|---|---|
| | 6 | 7 | 8 | 9 |
| k = | −1.1202E+01 | −1.2423E+01 | −2.2386E−01 | 5.8622E+00 |
| A4 = | −1.4191E−01 | −1.8106E−01 | 8.2051E−01 | 4.1503E−01 |
| A6 = | −1.5151E−01 | 5.8948E−01 | −8.4785E−01 | −1.0656E+00 |
| A8 = | −1.3307E−01 | −2.6832E+00 | −2.0183E+00 | 1.1148E+00 |
| A10 = | 7.0483E−01 | 5.5491E+00 | 7.6457E+00 | −6.0109E−01 |
| A12 = | −2.0154E+00 | −5.3893E+00 | −8.4344E+00 | 1.3333E−01 |
| A14 = | 1.6506E+00 | 2.0265E+00 | 3.2815E+00 | −4.6614E−03 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

7th Embodiment

| | | | |
|---|---|---|---|
| f [mm] | 3.45 | TL [mm] | 3.72 |
| Fno | 2.15 | |(R6 + R7)/(R6 − R7)| | 3.18 |
| HFOV [deg.] | 20.0 | f1/|f4| | 0.77 |
| V2 + V3 | 65.7 | f2/f4 | 1.07 |
| CT1/(CT2 + CT3 + CT4) | 0.44 | |f2/f3| | 0.90 |
| ΣCT/T23 | 2.53 | EPD/ImgH | 1.29 |
| T23/T34 | 3.98 | f/ImgH | 2.78 |
| BL/TL | 0.17 | SD11/SD42 | 0.69 |

8th Embodiment

Figure 8A:
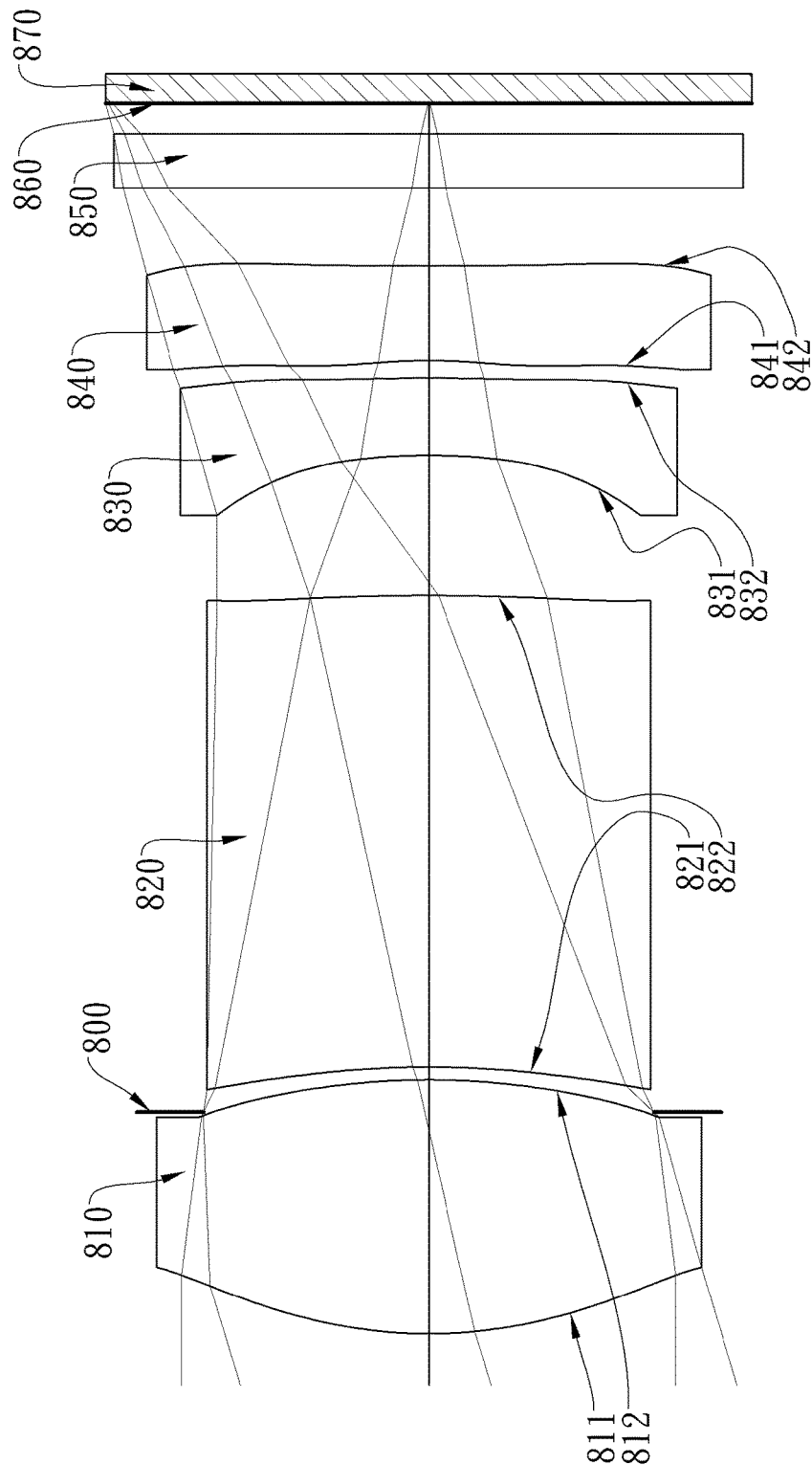
FIG. 8A is a schematic view of an image capturing apparatus according to the 8th embodiment of the present disclosure.
Figure 8B:
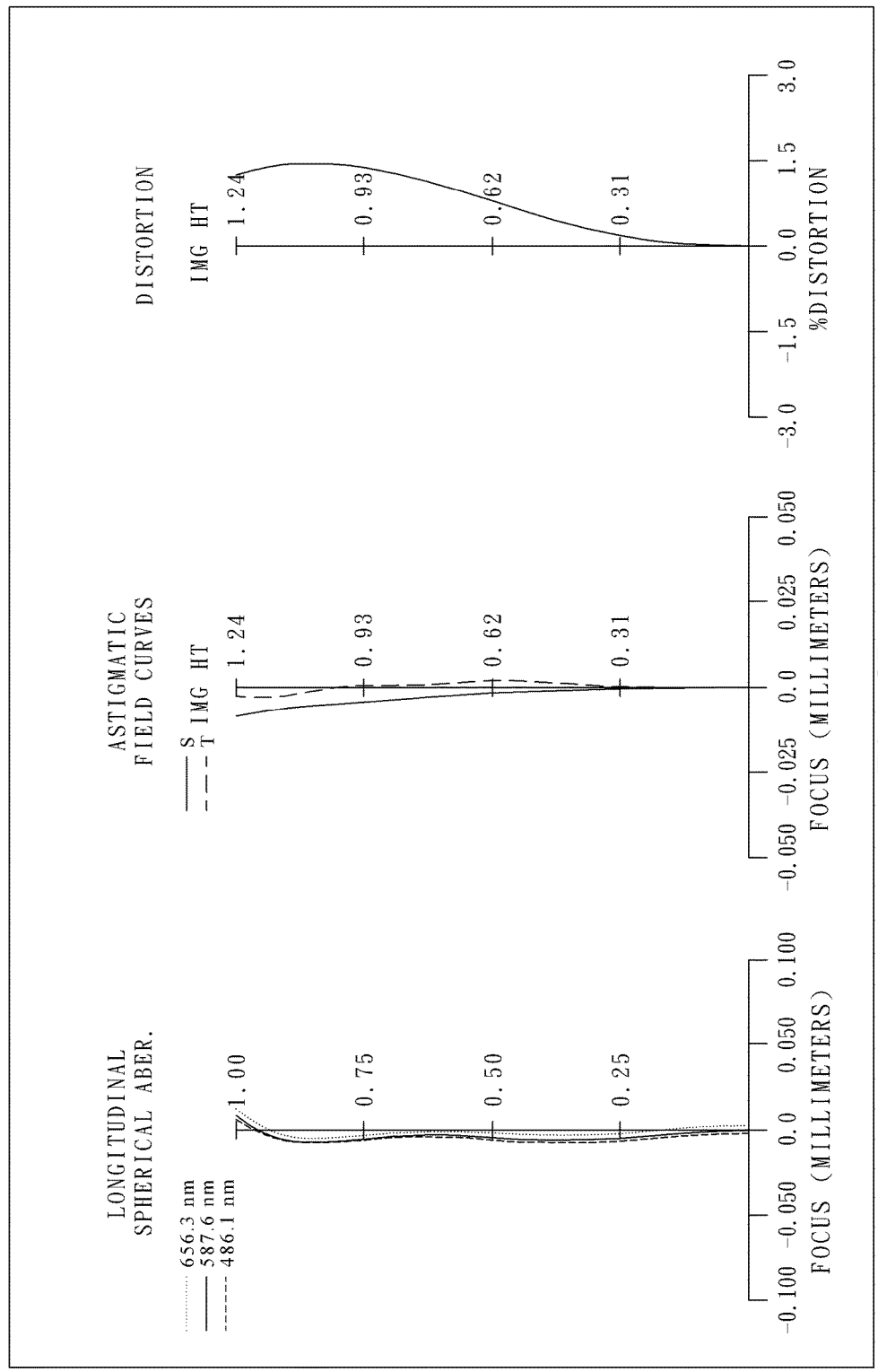
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus includes an imaging optical system (not otherwise herein labeled) of the present disclosure and an image sensor 870. The imaging optical system includes, in order from an object side to an image side: a first lens element 810, an aperture stop 800, a second lens element 820, a third lens element 830, and a fourth lens element 840. The imaging optical system has a total of four lens elements (810-840).

The first lens element 810 with positive refractive power has an object-side surface 811 being convex in a paraxial region thereof and an image-side surface 812 being convex in a paraxial region thereof, which are both aspheric, and the first lens element 810 is made of plastic material.

The second lens element 820 with negative refractive power has an object-side surface 821 being concave in a paraxial region thereof and an image-side surface 822 being convex in a paraxial region thereof, which are both aspheric, and the second lens element 820 is made of plastic material.

The third lens element 830 with negative refractive power has an object-side surface 831 being concave in a paraxial region thereof and an image-side surface 832 being convex in a paraxial region thereof, which are both aspheric, and the third lens element 830 is made of plastic material.

The fourth lens element 840 with negative refractive power has an object-side surface 841 being concave in a paraxial region thereof and an image-side surface 842 being convex in a paraxial region thereof, which are both aspheric, and the fourth lens element 840 is made of plastic material. Moreover, the fourth lens element 840 has at least one inflection point on the object-side surface 841 in an off-axial region thereof.

The imaging optical system further includes a filter 850 located between the fourth lens element 840 and an image surface 860. The filter 850 is made of glass and will not affect the focal length of the imaging optical system. The image sensor 870 is disposed on or near the image surface 860 of the imaging optical system.

The detailed optical data of the 8th embodiment are shown in TABLE 21, and the aspheric surface data are shown in TABLE 22, wherein the units of the curvature radius, the thickness and the focal length are expressed in mm, and HFOV is half of the maximal field of view.

TABLE 21

(8th Embodiment)
f = 4.01 mm, Fno = 2.10, HFOV = 17.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.864 | ASP | 0.982 | Plastic | 1.544 | 55.9 | 2.27 |
| 2 | | −2.967 | ASP | −0.125 | | | | |
| 3 | Ape. Stop | Plano | | 0.175 | | | | |
| 4 | Lens 2 | −3.647 | ASP | 1.826 | Plastic | 1.633 | 23.4 | −11.46 |
| 5 | | −8.761 | ASP | 0.543 | | | | |
| 6 | Lens 3 | −2.871 | ASP | 0.300 | Plastic | 1.633 | 23.4 | −9.31 |
| 7 | | −5.828 | ASP | 0.067 | | | | |
| 8 | Lens 4 | −2.004 | ASP | 0.367 | Plastic | 1.544 | 55.9 | −3.96 |
| 9 | | −30.830 | ASP | 0.300 | | | | |
| 10 | Filter | Plano | | 0.210 | Glass | 1.517 | 64.2 | — |
| 11 | | Plano | | 0.119 | | | | |
| 12 | Image Surface | Plano | | — | | | | |

Note:
Reference wavelength is d-line 587.6 nm

TABLE 22

Aspheric Coefficients

| | Surface # | | | |
|---|---|---|---|---|
| | 1 | 2 | 4 | 5 |
| k = | −7.1033E+00 | −1.0069E+00 | 4.9233E+00 | −5.0000E+01 |
| A4 = | 1.1725E−01 | 6.9593E−03 | 4.9699E−02 | −1.3199E−03 |
| A6 = | −1.0789E−01 | −3.2234E−02 | −7.2720E−02 | 8.2085E−02 |
| A8 = | 6.7480E−02 | 2.5629E−03 | 2.7729E−01 | −2.3948E−01 |
| A10 = | −3.5887E−02 | | −5.5807E−01 | 6.7925E−01 |
| A12 = | | | 5.7763E−01 | −9.0777E−01 |
| A14 = | | | −2.2973E−01 | 4.9519E−01 |

| | Surface # | | | |
|---|---|---|---|---|
| | 6 | 7 | 8 | 9 |
| k = | −1.0000E+00 | 2.6275E+01 | −7.9943E+00 | −1.0000E+00 |
| A4 = | −3.8041E−01 | 3.5008E−01 | 8.9369E−01 | 2.2598E−01 |
| A6 = | 3.1694E−01 | −1.9242E−01 | −1.4357E+00 | −5.2207E−01 |
| A8 = | −5.4836E−01 | −1.5468E+00 | 5.1213E−01 | 6.1235E−01 |
| A10 = | 9.1649E−01 | 3.1529E+00 | 5.3023E−01 | −5.2575E−01 |
| A12 = | −6.0326E−01 | −2.2155E+00 | −3.5063E−01 | 2.6978E−01 |
| A14 = | | 5.2263E−01 | −5.0573E−05 | −5.8535E−02 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 4.01 | TL [mm] | 4.76 |
| Fno | 2.10 | |(R6 + R7)/(R6 − R7)| | 2.05 |
| HFOV [deg.] | 17.0 | f1/|f4| | 0.57 |
| V2 + V3 | 46.8 | f2/f4 | 2.89 |
| CT1/(CT2 + CT3 + CT4) | 0.39 | |f2/f3| | 1.23 |
| ΣCT/T23 | 6.40 | EPD/ImgH | 1.54 |
| T23/T34 | 8.10 | f/ImgH | 3.23 |
| BL/TL | 0.13 | SD11/SD42 | 0.97 |

The foregoing description, for purpose of explanation, has been described with reference to specific embodiments. It is to be noted that TABLES 1-23 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical system, comprising, in order from an object side to an image side:
   a first lens element with positive refractive power having an object-side surface being convex in a paraxial region thereof;
   a second lens element having negative refractive power;
   a third lens element having an object-side surface being concave in a paraxial region thereof, both of the object-side surface and an image-side surface thereof being aspheric; and
   a fourth lens element with negative refractive power having an object-side surface being concave in a paraxial region thereof and an image-side surface being convex in a paraxial region thereof, both of the object-side surface and the image-side surface thereof being aspheric;
   wherein the imaging optical system has a total of four lens elements, and an air gap is arranged between every two adjacent lens elements;
   wherein the imaging optical system comprises an aperture stop disposed between an imaged object and the second lens element; and
   wherein a focal length of the second lens element is f2, a focal length of the fourth lens element is f4, a focal length of the imaging optical system is f, a maximum image height of the imaging optical system is ImgH, an axial distance between the second lens element and the third lens element is T23, an axial distance between the third lens element and the fourth lens element is T34, and the following conditions are satisfied:

$1.0 < f2/f4$;

$2.0 < f/ImgH$; and $1.0 < T23/T34$.

2. The imaging optical system of claim 1, wherein the focal length of the second lens element is f2, a focal length of the third lens element is f3, and the following condition is satisfied:

$|f2/f3| < 1.25$.

3. The imaging optical system of claim 2, wherein the focal length of the second lens element is f2, the focal length of the third lens element is f3, and the following condition is satisfied:

$|f2/f3| < 1.0$.

4. The imaging optical system of claim 1, wherein the second lens element has an object-side surface being convex in a paraxial region thereof, and an image-side surface being concave in a paraxial region thereof.

5. The imaging optical system of claim 1, wherein a central thickness of the first lens element is CT1, a central thickness of the second lens element is CT2, a central thickness of the third lens element is CT3, a central thickness of the fourth lens element is CT4, and the following condition is satisfied:

$0.50 < CT1/(CT2+CT3+CT4) < 1.50$.

6. The imaging optical system of claim 1, wherein a vertical distance from a maximum effective diameter position on the object-side surface of the first lens element to an optical axis is SD11, a vertical distance from a maximum effective diameter position on the image-side surface of the fourth lens element to the optical axis is SD42, and the following condition is satisfied:

$0.65 < SD11/SD42 < 1.20$.

7. The imaging optical system of claim 1, wherein a sum of central thicknesses of the first lens element, the second lens element, the third lens element, and the fourth lens element is ΣCT, the axial distance between the second lens element and the third lens element is T23, and the following condition is satisfied:

$\Sigma CT/T23 < 1.50$.

8. The imaging optical system of claim 1, wherein an entrance pupil diameter of the imaging optical system is EPD, the maximum image height of the imaging optical system is ImgH, and the following condition is satisfied:

$0.80 < EPD/ImgH < 2.0$.

9. The imaging optical system of claim 1, wherein an Abbe number of the second lens element is V2, an Abbe number of the third lens element is V3, and the following condition is satisfied:

$V2+V3 < 60$.

10. The imaging optical system of claim 1, wherein a curvature radius of the image-side surface of the third lens element is R6, a curvature radius of the object-side surface of the fourth lens element is R7, and the following condition is satisfied:

$|(R6+R7)/(R6-R7)| < 30$.

11. The imaging optical system of claim 1, wherein the axial distance between the second lens element and the third lens element is T23, the axial distance between the third lens element and the fourth lens element is T34, and the following condition is satisfied:

$2.0 < T23/T34$.

12. The imaging optical system of claim 11, wherein the axial distance between the second lens element and the third lens element is T23, the axial distance between the third lens element and the fourth lens element is T34, and the following condition is satisfied:

$3.0 < T23/T34$.

13. The imaging optical system of claim 12, wherein a sum of central thicknesses of the first lens element, the second lens element, the third lens element, and the fourth lens element is ΣCT, the axial distance between the second lens element and the third lens element is T23, and the following condition is satisfied:

$1.0 < \Sigma CT/T23 < 10$.

14. The imaging optical system of claim 1, wherein a focal length of the first lens element is f1, the focal length of the fourth lens element is f4, and the following condition is satisfied:

$0.60 < |f1/f4| < 1.20$.

15. The imaging optical system of claim 1, wherein the second lens element has an object-side surface being concave in a paraxial region thereof.

16. The imaging optical system of claim 1, wherein an axial distance between the image-side surface of the fourth lens element and an image surface is BL, an axial distance between the object-side surface of the first lens element and the image surface is TL, and the following condition is satisfied:

$$0<BL/TL<0.25.$$

17. The imaging optical system of claim 1, wherein the fourth lens element has at least one inflection point on the object-side surface in an off-axial region thereof.

18. The imaging optical system of claim 1, wherein the imaging optical system is applicable in a light wavelength range of 750 to 1050 nm.

19. The imaging optical system of claim 1, wherein the object-side and image-side surfaces of the first lens element, the second lens element, the third lens element, and the fourth lens element are all aspheric; the first lens element, the second lens element, the third lens element, and the fourth lens element are all made of plastic material; and an axial distance between the object-side surface of the first lens element and an image surface is TL, and the following condition is satisfied:

$$TL<6.0 \text{ mm}.$$

20. An image capturing apparatus, comprising the imaging optical system of claim 1 and an image sensor disposed on or near an image surface of the imaging optical system.

21. An electronic device, comprising the image capturing apparatus of claim 20.

22. An imaging optical system, comprising, in order from an object side to an image side:
a first lens element with positive refractive power having an object-side surface being convex in a paraxial region thereof;
a second lens element having negative refractive power;
a third lens element having an object-side surface being concave in a paraxial region thereof, both of the object-side surface and an image-side surface thereof being aspheric; and
a fourth lens element with negative refractive power having an object-side surface being concave in a paraxial region thereof and an image-side surface being convex in a paraxial region thereof, both of the object-side surface and the image-side surface thereof being aspheric;
wherein the imaging optical system has a total of four lens elements, and an air gap is arranged between every two adjacent lens elements; and
wherein a focal length of the second lens element is f2, a focal length of the fourth lens element is f4, a focal length of the imaging optical system is f, a maximum image height of the imaging optical system is ImgH, an axial distance between the second lens element and the third lens element is T23, an axial distance between the third lens element and the fourth lens element is T34, and the following conditions are satisfied:

$$1.0<f2/f4;$$

$$2.40<f/\text{ImgH}<5.0; \text{ and}$$

$$1.0<T23/T34.$$

23. The imaging optical system of claim 22, wherein the focal length of the second lens element is f2, a focal length of the third lens element is f3, and the following condition is satisfied:

$$|f2/f3|<1.25.$$

24. The imaging optical system of claim 23, wherein the focal length of the second lens element is f2, the focal length of the third lens element is f3, and the following condition is satisfied:

$$|f2/f3|<1.0.$$

25. The imaging optical system of claim 22, further comprising an aperture stop disposed between an imaged object and the second lens element.

26. The imaging optical system of claim 22, wherein the second lens element has an object-side surface being convex in a paraxial region thereof, and an image-side surface being concave in a paraxial region thereof.

27. The imaging optical system of claim 22, wherein a central thickness of the first lens element is CT1, a central thickness of the second lens element is CT2, a central thickness of the third lens element is CT3, a central thickness of the fourth lens element is CT4, and the following condition is satisfied:

$$0.50<CT1/(CT2+CT3+CT4)<1.50.$$

28. The imaging optical system of claim 22, wherein a vertical distance from a maximum effective diameter position on the object-side surface of the first lens element to an optical axis is SD11, a vertical distance from a maximum effective diameter position on the image-side surface of the fourth lens element to the optical axis is SD42, and the following condition is satisfied:

$$0.65<SD11/SD42<1.20.$$

29. The imaging optical system of claim 22, wherein a sum of central thicknesses of the first lens element, the second lens element, the third lens element, and the fourth lens element is ΣCT, the axial distance between the second lens element and the third lens element is T23, and the following condition is satisfied:

$$\Sigma CT/T23<1.50.$$

30. The imaging optical system of claim 22, wherein an entrance pupil diameter of the imaging optical system is EPD, the maximum image height of the imaging optical system is ImgH, and the following condition is satisfied:

$$0.80<EPD/\text{ImgH}<2.0.$$

31. The imaging optical system of claim 22, wherein an Abbe number of the second lens element is V2, an Abbe number of the third lens element is V3, and the following condition is satisfied:

$$V2+V3<60.$$

32. The imaging optical system of claim 22, wherein a curvature radius of the image-side surface of the third lens element is R6, a curvature radius of the object-side surface of the fourth lens element is R7, and the following condition is satisfied:

$$|(R6+R7)/(R6-R7)|<30.$$

33. The imaging optical system of claim 22, wherein the axial distance between the second lens element and the third lens element is T23, the axial distance between the third lens element and the fourth lens element is T34, and the following condition is satisfied:

$$2.0<T23/T34.$$

34. The imaging optical system of claim 33, wherein the axial distance between the second lens element and the third lens element is T23, the axial distance between the third lens element and the fourth lens element is T34, and the following condition is satisfied:

$$3.0 < T23/T34.$$

35. The imaging optical system of claim 34, wherein a sum of central thicknesses of the first lens element, the second lens element, the third lens element, and the fourth lens element is ΣCT, the axial distance between the second lens element and the third lens element is T23, and the following condition is satisfied:

$$1.0 < \Sigma CT/T23 < 10.$$

36. The imaging optical system of claim 22, wherein a focal length of the first lens element is f1, the focal length of the fourth lens element is f4, and the following condition is satisfied:

$$0.60 < f1/|f4| < 1.20.$$

37. The imaging optical system of claim 22, wherein the second lens element has an object-side surface being concave in a paraxial region thereof.

38. The imaging optical system of claim 22, wherein an axial distance between the image-side surface of the fourth lens element and an image surface is BL, an axial distance between the object-side surface of the first lens element and the image surface is TL, and the following condition is satisfied:

$$0 < BL/TL < 0.25.$$

39. The imaging optical system of claim 22, wherein the fourth lens element has at least one inflection point on the object-side surface in an off-axial region thereof.

40. The imaging optical system of claim 22, wherein the imaging optical system is applicable in a light wavelength range of 750 to 1050 nm.

41. The imaging optical system of claim 22, wherein the object-side and image-side surfaces of the first lens element, the second lens element, the third lens element, and the fourth lens element are all aspheric; the first lens element, the second lens element, the third lens element, and the fourth lens element are all made of plastic material; and an axial distance between the object-side surface of the first lens element and an image surface is TL, and the following condition is satisfied:

$$TL < 6.0mm.$$

42. An image capturing apparatus, comprising the imaging optical system of claim 22 and an image sensor disposed on or near an image surface of the imaging optical system.

43. An electronic device, comprising the image capturing apparatus of claim 42.

* * * * *